US012779329B2

(12) United States Patent
Zheng et al.

(10) Patent No.: US 12,779,329 B2
(45) Date of Patent: Nov. 3, 2026

(54) METHOD AND APPARATUS FOR CONTROLLING SKILL INDICATOR, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Yu Zheng, Shenzhen (CN); Yafei Song, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 433 days.

(21) Appl. No.: 18/321,763

(22) Filed: Oct. 23, 2023

(65) Prior Publication Data

US 2024/0033629 A1 Feb. 1, 2024

Related U.S. Application Data

(63) Continuation of application No. PCT/CN2022/092673, filed on May 13, 2022.

(30) Foreign Application Priority Data

Jun. 22, 2021 (CN) ......................... 202110693621.2

(51) Int. Cl.
*A63F 13/537* (2014.01)
*A63F 13/42* (2014.01)
(Continued)

(52) U.S. Cl.
CPC ............ *A63F 13/537* (2014.09); *A63F 13/42* (2014.09); *A63F 13/533* (2014.09); *A63F 13/55* (2014.09);
(Continued)

(58) Field of Classification Search
CPC ...... A63F 13/537; A63F 13/533; A63F 13/55; A63F 13/42; A63F 13/822; A63F 13/79; A63F 2300/308
See application file for complete search history.

(56) References Cited

U.S. PATENT DOCUMENTS 6,478,678 B1 11/2002 Rimoto et al.
6,482,086 B1 11/2002 Rimoto et al.
(Continued)

FOREIGN PATENT DOCUMENTS

CN 105688409 A 6/2016
CN 111467802 A 7/2020
(Continued)

OTHER PUBLICATIONS

The World Intellectual Property Organization (WIPO) International Search Report for PCT/CN2022/092673 Jul. 27, 2022 14 Pages (including translation).
(Continued)

*Primary Examiner* — Carl V Larsen
(74) *Attorney, Agent, or Firm* — ANOVA LAW GROUP, PLLC

(57) ABSTRACT

This application discloses a method and apparatus for controlling a skill indicator, a storage medium, and an electronic device. The method is performed by the electronic device and includes: obtaining a target selection instruction in a game application, the target selection instruction selecting a target virtual skill of a first virtual character; displaying a skill indicator of the target virtual skill in the game application in response to the target selection instruction; and controlling, when a target following function is enabled in the game application, the skill indicator to move along with a target object in the game application.

17 Claims, 20 Drawing Sheets

(51) Int. Cl.
*A63F 13/533* (2014.01)
*A63F 13/55* (2014.01)
*A63F 13/822* (2014.01)

(52) U.S. Cl.
CPC ...... *A63F 13/822* (2014.09); *A63F 2300/308* (2013.01)

(56) References Cited

U.S. PATENT DOCUMENTS

| | | | | |
|---|---|---|---|---|
| 6,482,090 | B1 | 11/2002 | Rimoto et al. | |
| 8,210,943 | B1 * | 7/2012 | Woodard | A63F 13/69 463/2 |
| 10,035,064 | B2 * | 7/2018 | Garvin | A63F 13/45 |
| 11,465,040 | B2 * | 10/2022 | Hall | A63F 13/5372 |
| 2006/0084509 | A1 * | 4/2006 | Novak | A63F 13/30 463/30 |
| 2009/0325660 | A1 * | 12/2009 | Langridge | A63F 13/45 463/2 |
| 2018/0024660 | A1 * | 1/2018 | Wang | G06F 3/04817 273/110 |
| 2018/0028906 | A1 * | 2/2018 | Tang | G06F 3/04842 |
| 2018/0121086 | A1 * | 5/2018 | Wang | A63F 13/426 |
| 2018/0369693 | A1 * | 12/2018 | Rong | A63F 13/92 |
| 2019/0336853 | A1 * | 11/2019 | Tang | A63F 13/426 |
| 2019/0366213 | A1 * | 12/2019 | Zhou | A63F 13/533 |
| 2020/0402349 | A1 * | 12/2020 | Karrbrink | G07F 17/3258 |
| 2021/0322864 | A1 * | 10/2021 | Shao | A63F 13/92 |
| 2022/0032183 | A1 | 2/2022 | Wei et al. | |
| 2022/0035515 | A1 | 2/2022 | Wan et al. | |
| 2022/0080316 | A1 * | 3/2022 | Huang | A63F 13/56 |
| 2022/0134220 | A1 * | 5/2022 | Dang | A63F 13/2145 463/37 |
| 2024/0115944 | A1 | 4/2024 | Wei et al. | |
| 2024/0143145 | A1 | 5/2024 | Wan et al. | |
| 2024/0226736 | A1 | 7/2024 | Hu et al. | |

FOREIGN PATENT DOCUMENTS

| | | | |
|---|---|---|---|
| CN | 111530075 | A | 8/2020 |
| CN | 111589140 | A | 8/2020 |
| CN | 111672119 | A | 9/2020 |
| CN | 112957737 | A | 6/2021 |
| CN | 113304478 | A | 8/2021 |
| JP | 2002058866 | A | 2/2002 |
| JP | 2002058867 | A | 2/2002 |
| JP | 2002058868 | A | 2/2002 |

OTHER PUBLICATIONS

The Japan Patent Office (JPO) Notification of Reasons for Refusal for Application No. 2023-571153 Sep. 3, 2024 23 Pages (including translation).

* cited by examiner

METHOD AND APPARATUS FOR CONTROLLING SKILL INDICATOR, STORAGE MEDIUM, AND ELECTRONIC DEVICE

RELATED APPLICATIONS

This application is a continuation of PCT Application No. PCT/CN2022/092673, filed on May 13, 2022, which in turn claims priority to Chinese Patent Application No. 202110693621.2, entitled "METHOD AND APPARATUS FOR CONTROLLING SKILL INDICATOR, STORAGE MEDIUM, AND ELECTRONIC DEVICE" filed with the China National Intellectual Property Administration on Jun. 22, 2021. The two applications are incorporated herein by reference in their entirety.

FIELD OF THE TECHNOLOGY

This application relates to the field of computers, and specifically, to a method and apparatus for controlling a skill indicator, a storage medium, and an electronic device.

BACKGROUND OF THE DISCLOSURE

In a game application, during skill casting, a player usually needs to press a skill button to display a skill indicator corresponding to the skill, and then the player adjusts a direction or position of the skill indicator and casts the skill based on the adjusted skill indicator.

However, in game applications having a higher requirement for continuously assisting aiming, for example, some game applications that control an operation through joysticks, since movement of a character needs to be controlled by using a joystick, a skill key needs to be pressed to cast a skill, and a direction or position of a skill indicator needs to be simultaneously adjusted by using another joystick, such an interaction increases complexity of a player's operation in a game scene that requires quick and precise aiming, and it is relatively difficult for many players.

In addition, in a process of casting a skill by using a joystick, a physical key on the joystick needs to be pressed to start skill casting, and a corresponding joystick needs to be operated to adjust a direction or position of a skill indicator of the skill. Since there is a physical distance between the joystick and the physical key, a finger needs to move from the physical key to the joystick to start aiming, which causes a delay, and reduces fluency of casting a skill by the player, resulting in lower efficiency of casting the skill by the player.

SUMMARY

Embodiments of this application provide a method and apparatus for controlling a skill indicator, a storage medium, and an electronic device, to resolve at least a technical problem of relatively high user operation complexity during skill casting in the related art.

One aspect of the embodiments of this application provides a method for controlling a skill indicator. The method is performed by an electronic device and includes obtaining a target selection instruction in a game application, the target selection instruction selecting a target virtual skill of a first virtual character; displaying a skill indicator of the target virtual skill in the game application in response to the target selection instruction; and controlling, when a target following function is enabled in the game application, the skill indicator to move along with a target object in the game application.

Another aspect of the embodiments of this application further provides a non-transitory computer-readable storage medium, storing a computer program, the computer program being configured to perform, when run, the method for controlling a skill indicator.

In embodiments of this application, a following function is configured for the skill indicator. The skill indicator may automatically move along with a target object (for example, move along with a locked virtual character or move along with a joystick), and there is no need for a user to manually adjust a direction or position of the skill indicator during skill casting, thereby reducing operation complexity for casting a skill, and resolving the technical problem of high operation complexity during skill casting in the related art.

Further, the skill indicator can automatically move along with the target object, which avoids a delay caused by moving a finger from a physical key to a joystick for aiming, thereby improving ease of casting a skill in a game.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, the claims, and the accompanying drawings of this application, the terms "first", "second", and so on are intended to distinguish similar objects but do not necessarily indicate a specific order or sequence. It is to be understood that the data termed in such a way is interchangeable in proper circumstances, so that the embodiments of this application described herein can be implemented in other sequences than the sequence illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

First, some nouns or terms that appear during descriptions of the embodiments of this application are applicable to the following explanations:

MOBA: It is a multiplayer online battle arena game.

Skill indicator: It is a UI prompt for selecting a direction or position for casting a skill by a game character. A player may press a skill key to display a position of the skill indicator; and release the skill key to cast a skill toward a current direction/position of the indicator.

Directional skill: It is a skill cast in a direction, where a direction in which the skill is cast may be selected through the skill indicator.

Point selecting skill: It is a skill cast at a specific position, where a position at which the skill is cast may be selected through the skill indicator.

Locking skill: It is a skill cast on a target, where a target on which the skill is cast may be selected through the skill indicator.

Movement skill: It is a skill that can be cast to change a position of a character controlled by a player.

This application is described below with reference to embodiments.

Figure 1:
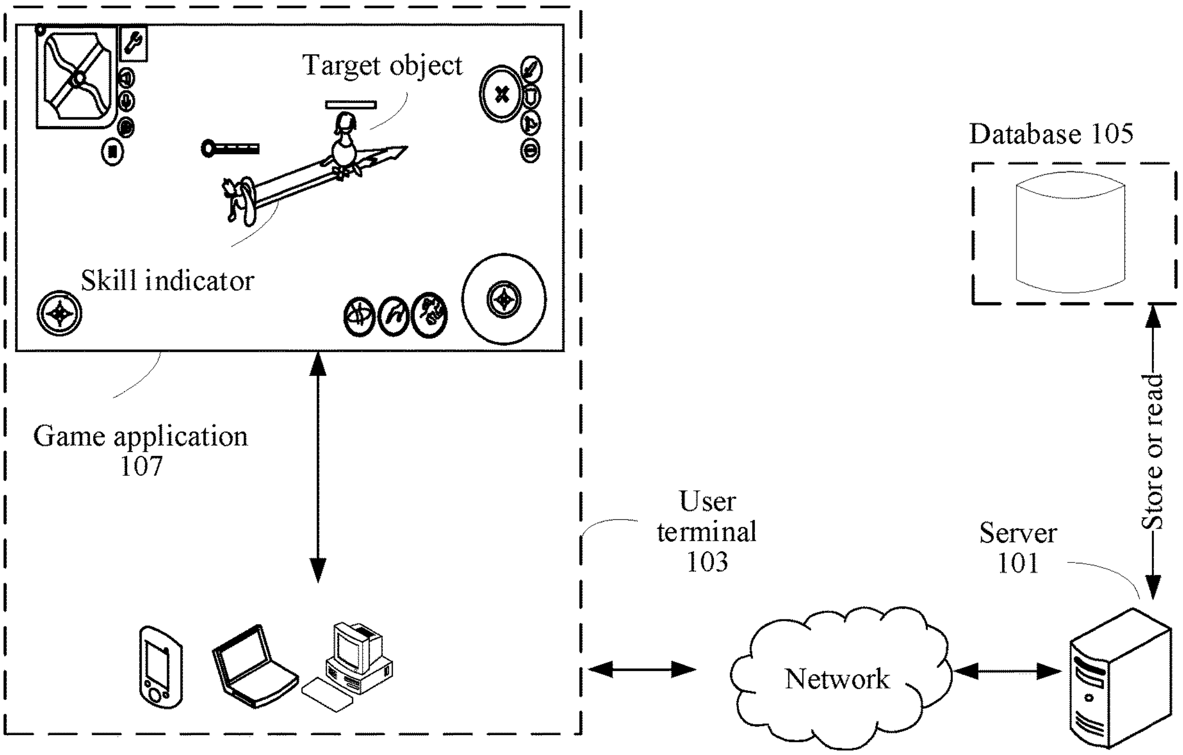
FIG. 1 is a schematic diagram of an application environment of a method for controlling a skill indicator according to an embodiment of this application.

According to an aspect of the embodiments of this application, a method for controlling a skill indicator is provided. In this embodiment, the method for controlling a skill indicator may be applied to a computer environment that is formed by a server 101 and a user terminal 103 and that is shown in FIG. 1. As shown in FIG. 1, the server 101 is connected to the terminal 103 through a network, and may be configured to provide services for the user terminal or a client installed on the user terminal. The client may be a video client, an instant messaging client, a browser client, an education client, a game client, or the like. A database 105 may be configured on the server or independent of the server, to provide a data storage service for the server 101, for example, a game data storage server. The network may include, a wired network or a wireless network. The wired network includes a local area network, a metropolitan area network, and a wide area network. The wireless network includes: Bluetooth, Wi-Fi, and other networks implementing wireless communication. The user terminal 103 may be a terminal configured with an application, and may include, at least one of the following: a mobile phone (such as an Android mobile phone or an iOS mobile phone), a notebook computer, a tablet computer, a palmtop computer, a mobile Internet device (MID), a PAD, a desktop computer, a smart TV, or another computer device. The server may be an independent server, or may be a cluster server including a plurality of servers, or may be a cloud server. A game application 107 using the method for controlling a skill indicator is displayed through the user terminal 103.

With reference to FIG. 1, the method for controlling a skill indicator may be implemented by the user terminal 103 in the following steps:

S1: Obtain a target selection instruction in a game application 107 of the user terminal 103, the target selection instruction being used for selecting a target virtual skill of a first virtual character as a virtual skill to be cast.

S2: Display a skill indicator of a target virtual skill in a game application in response to the target selection instruction in the game application 107 of the user terminal 103, where the skill indicator is configured to indicate a direction or position for casting the target virtual skill.

S3: Control, when a target following function is enabled in the game application 107 of the user terminal 103, the skill indicator to move along with a target object in the game application, the target following function being used for controlling the skill indicator to move along with the target object.

Figure 2:
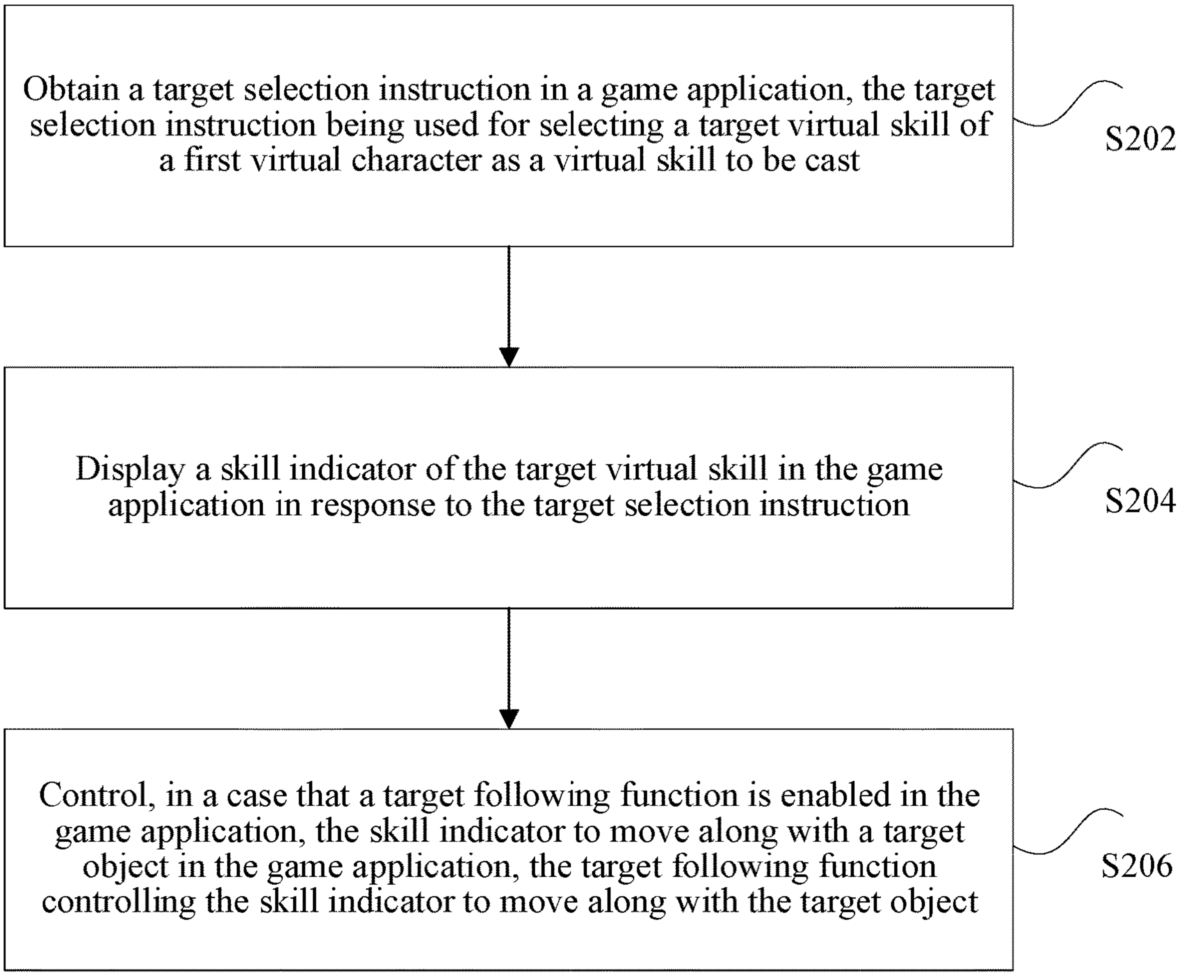
FIG. 2 is a schematic flowchart of a method for controlling a skill indicator according to an embodiment of this application.

In one embodiment, as shown in FIG. 2, the method for controlling a skill indicator includes the following steps:

S202: Obtain a target selection instruction in a game application, the target selection instruction being used for selecting a target virtual skill of a first virtual character as a virtual skill to be cast.

S204: Display a skill indicator of the target virtual skill in the game application in response to the target selection instruction.

S206: Control, when a target following function is enabled in the game application, the skill indicator to move along with a target object in the game application, the target following function being used for controlling the skill indicator to move along with the target object.

In this embodiment, the skill indicator is configured to indicate a direction or position for casting the target virtual skill.

In this embodiment, the game application is a game application of one or a combination of various types of game applications such as a MOBA game application and a shooting application. The multiplayer online battle arena (MOBA) game is also referred to as an action real-time strategy (ARTS). The MOBA game is runnable on a terminal device (such as a mobile phone terminal and a PC end).

In this embodiment, the target selection instruction may include, a touch interaction operation such as pressing, clicking/tapping, double-clicking/tapping. For example, the pressing operation may include, pressing a corresponding interaction button without releasing the interaction button, to implement the foregoing target selection instruction.

In this embodiment, the first virtual character may include, a virtual character generated in a game application, and specifically, may include, a virtual character controlled by an account that logs in to the game application and plays a round of game.

In this embodiment, the target virtual skill may include, being associated with the first virtual character and cast in a preconfigured interaction manner.

Figure 3:
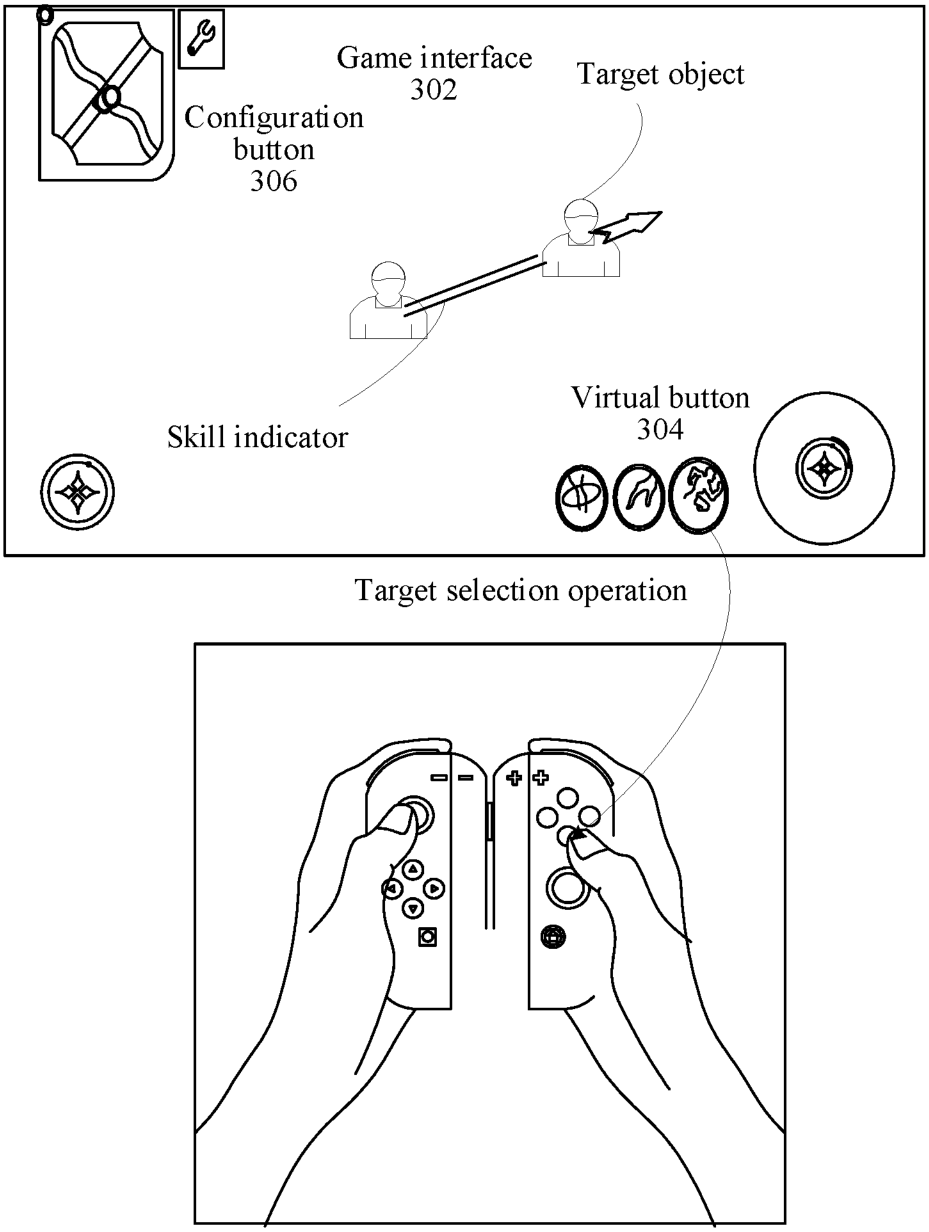
FIG. 3 is a schematic diagram of a method for controlling a skill indicator according to an embodiment of this application.

FIG. 3 is a schematic diagram of a method for controlling a skill indicator according to an embodiment of this application. As shown in FIG. 3, the method may include, implementing control of the skill indicator by using a virtual button or a joystick, and specifically includes the following steps:

S1: Display a target object, a skill indicator, and a virtual button 304 on a game interface 302, where the virtual button 304 may include, being associated with a key A of the joystick.

S2: Determine, after a touch operation performed on the virtual button 304 or a touch operation performed on the key A of the joystick is obtained, to obtain the target selection instruction.

S3: Display a skill indicator of a target virtual skill in a game application in response to the target selection instruction, where the skill indicator is configured to indicate a direction or position for casting the target virtual skill.

S4: Control, when a target following function is enabled in the game application, the skill indicator to move along with a target object in the game application, the target following function being used for controlling the skill indicator to move along with the target object.

The target following function may include, being preconfigured by a system or a user. For example, the target following function is enabled through a configuration button 306 shown in FIG. 3.

In this embodiment, the target object may include, a virtual object that bears the target virtual skill in the game application. For example, the target object may be a virtual hero, a virtual destructible object, a virtual monster, or another target object. The target object may further be implemented by controlling the joystick by the virtual object on which the target virtual skill is performed. For example, when the joystick is controlled upward, the skill indicator moves upward along with the joystick, to update the direction or position for casting the target virtual skill.

In this embodiment, a type of the skill indicator may include, one or a combination of an arrow, a virtual beam, a shadow, and the like. The skill indicator is allowed to indicate any one of a direction or position for casting the target virtual skill in the game application.

In this embodiment, the target following function may include, a function of enabling or disabling the method for controlling a skill indicator, for example, controlling the skill indicator to move along with the target object, and may further include adjusting an amplitude for controlling the skill indicator to move along with the target object, and the like.

In this embodiment, the controlling skill indicator to move along with the target object may include, automatically controlling change of the skill indicator in the position or direction.

In the embodiments of this application, a following function is configured for the skill indicator, so that the skill indicator may automatically move along with a target object (for example, move along with a locked virtual character or move along with a joystick), and there is no need for a user to manually adjust a direction or position of the skill indicator during skill casting, thereby reducing operation complexity for casting a skill, and resolving the technical problem of high operation complexity during skill casting in the related art.

Further, the skill indicator can automatically move along with the target object, which avoids a delay caused by moving a finger from a physical key to a joystick for aiming in the related art, thereby improving fluency of casting a skill.

In some embodiments, the controlling, when a target following function is enabled in the game application, the skill indicator to move along with a target object in the game application includes:

controlling, when a first following function is enabled in the game application, the skill indicator to move along with a second virtual character in the game application, where the target following function includes the first following function, the target object includes the second virtual character, and the second virtual character is a virtual character meeting a preset attack condition within a skill range of the target virtual skill.

In this embodiment, the first following function may include, a following function that continuously locks a target object. For example, the skill indicator selects a second virtual character within the skill range according to a rule and continuously follows the second virtual character, and after the second virtual character is dead or leaves the skill range, the skill indicator searches for another virtual character meeting the rule again, and then continuously follows the virtual character.

In this embodiment, the preset attack condition may include, that the second virtual character is a virtual character allowed to bear the target virtual skill, the second virtual character is a virtual character within the skill range of the target virtual skill, the second virtual character is a virtual character with a highest priority when the target virtual skill selects a target, and the like. The preset attack condition may further include one or a combination of the foregoing conditions and another scenario in which a virtual character can be determined.

Figure 4:
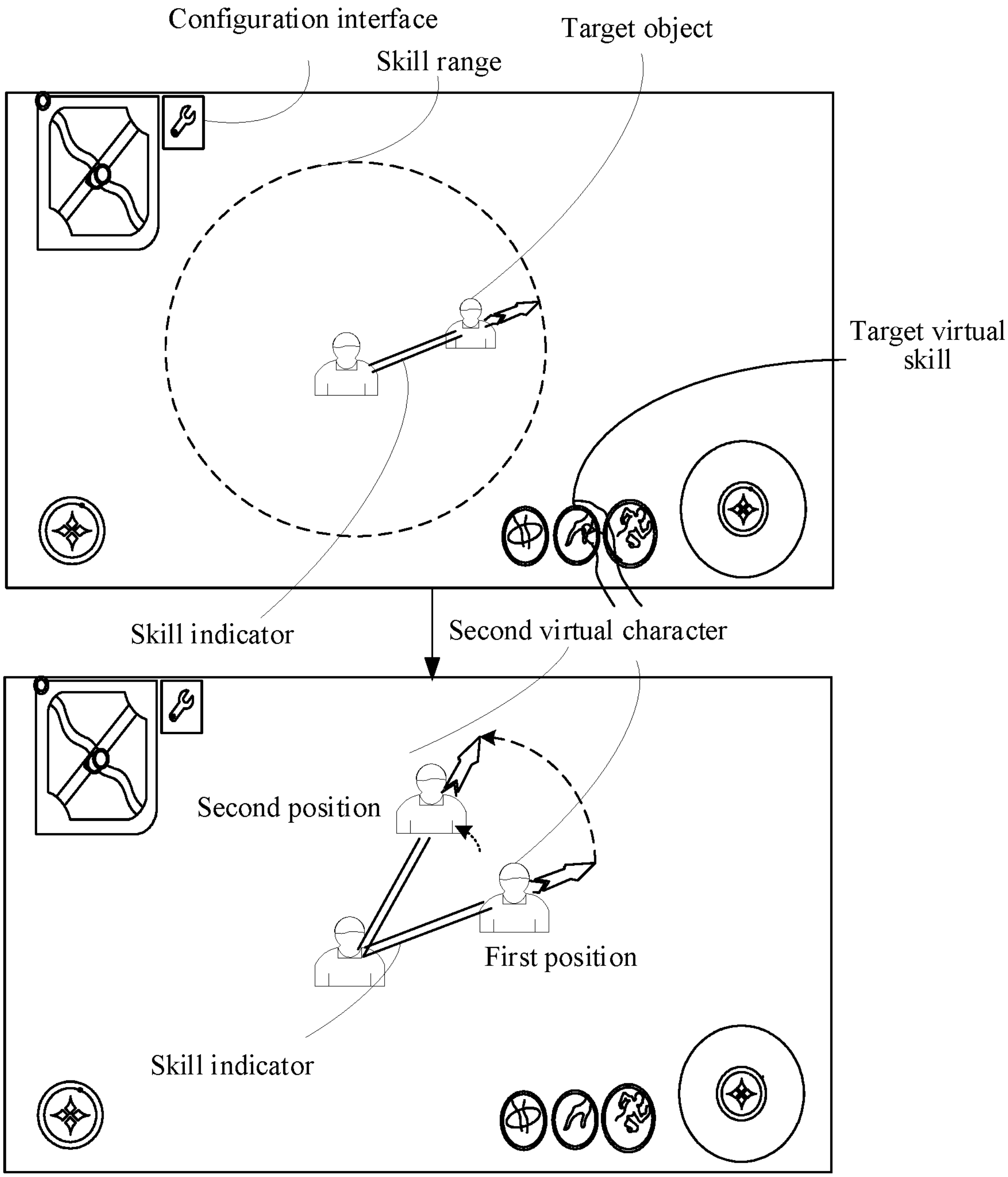
FIG. 4 is a schematic diagram of another method for controlling a skill indicator according to an embodiment of this application.

FIG. 4 is a schematic diagram of another method for controlling a skill indicator according to an embodiment of this application. As shown in FIG. 4, the method includes, but is not limited to, the following steps:

S1: The first following function is enabled on a configuration interface of the game application, and certainly, the first following function may alternatively be configured to be enabled by fault.

S2: Detect, when a target selection instruction (a press operation on a target virtual skill shown in FIG. 4) is obtained, whether the second virtual character moves.

S3: Control, when the second virtual character is detected to move from a first position to a second position, the skill indicator to move along with the second virtual character.

The foregoing description is merely an example, which is not specifically limited in this embodiment.

In some embodiments, the controlling, when a target following function is enabled in the game application, the skill indicator to move along with a target object in the game application includes:

controlling, when the first following function is enabled in the game application, and the virtual character meeting the preset attack condition within the skill range is changed from the second virtual character to a third virtual character, the skill indicator to move along with the third virtual character in the game application, where the target object includes the third virtual character.

In this embodiment, the third virtual character may have a higher priority for responding to the target virtual skill than that of the second virtual character. When a third virtual character with a higher priority is detected within the skill range of the target virtual skill, the virtual character followed by the skill indicator is adjusted from the second virtual character to the third virtual character, so that the skill indicator moves along with the third virtual character.

Figure 5:
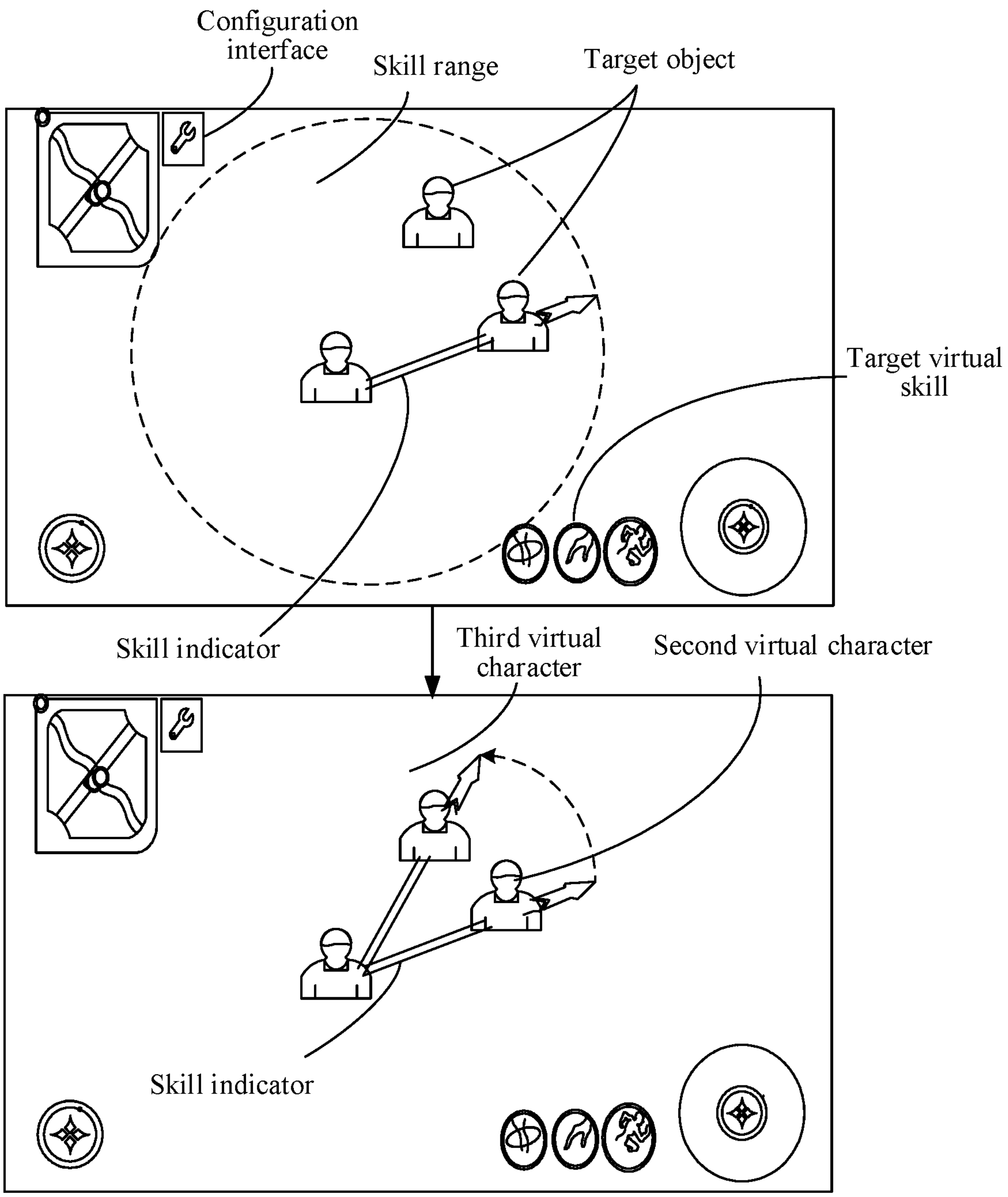
FIG. 5 is a schematic diagram of another method for controlling a skill indicator according to an embodiment of this application.

FIG. 5 is a schematic diagram of another method for controlling a skill indicator according to an embodiment of this application. As shown in FIG. 5, the method includes, but is not limited to, the following steps:

S1: The first following function is enabled on a configuration interface of the game application, and certainly, the first following function may alternatively be configured to be enabled by fault.

S2: Detect, when a target selection instruction (a press operation on a target virtual skill shown in FIG. 4) is obtained, whether a third virtual character appears within the skill range of the target virtual skill.

S3: Control, when the third virtual character is detected, the skill indicator to move along with the third virtual character.

The foregoing description is merely an example, which is not specifically limited in this embodiment.

In some embodiments, the controlling, when a target following function is enabled in the game application, the skill indicator to move along with a target object in the game application includes:

controlling, when the first following function is enabled in the game application, and the second virtual character leaves the skill range and a fourth virtual character appears within the skill range, the skill indicator to move along with the fourth virtual character in the game application, where the target object includes the fourth virtual character, and the fourth virtual character is a virtual character meeting the preset attack condition within the skill range.

In this embodiment, that the second virtual character leaves the skill range may include, that a position of the second virtual character moves from the skill range to outside the skill range.

Figure 6:
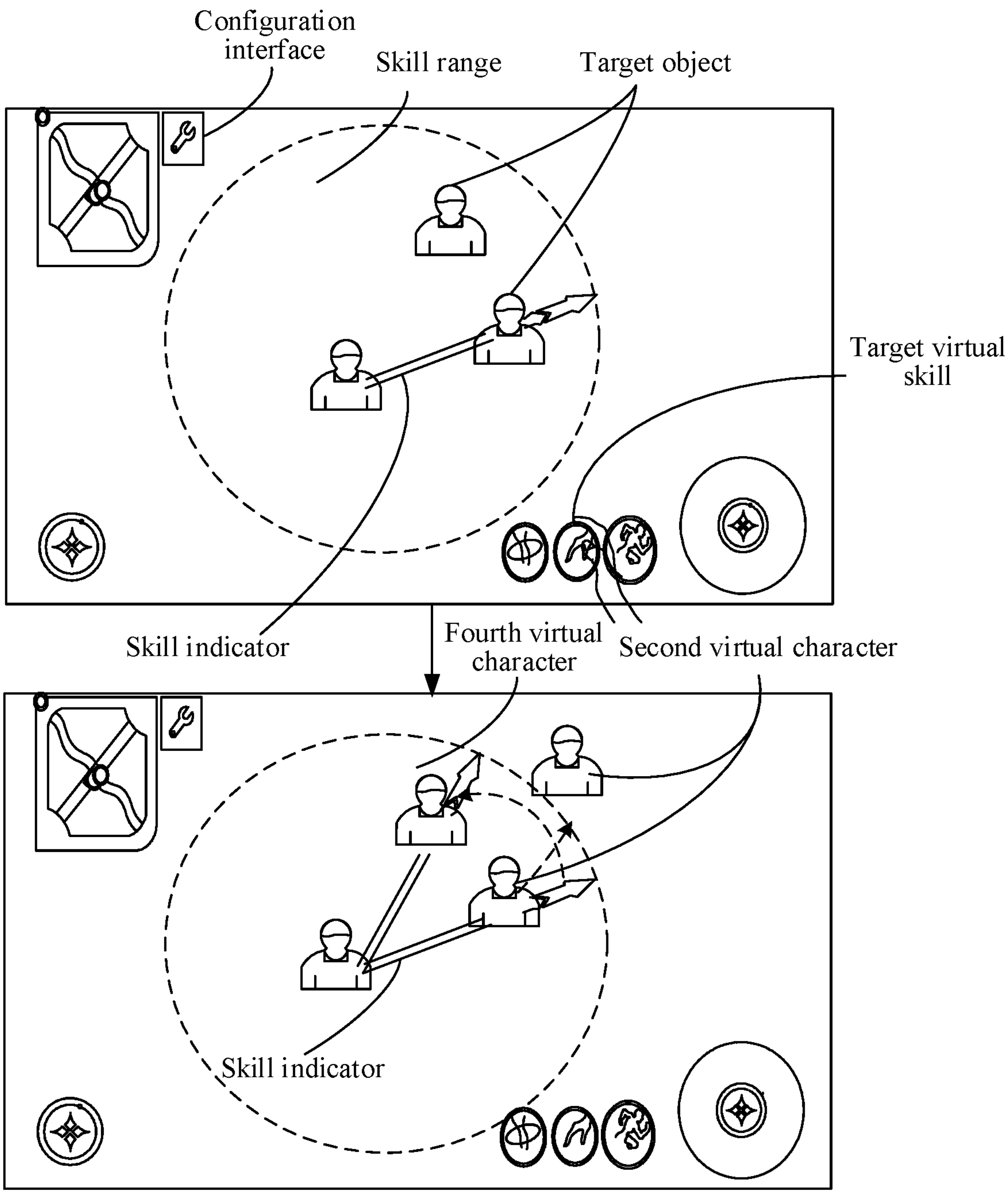
FIG. 6 is a schematic diagram of another method for controlling a skill indicator according to an embodiment of this application.

FIG. 6 is a schematic diagram of another method for controlling a skill indicator according to an embodiment of this application. As shown in FIG. 6, the method includes, but is not limited to, the following steps:

S1: The first following function is enabled on a configuration interface of the game application, and certainly, the first following function may alternatively be configured to be enabled by fault.

S2: Detect, when a target selection instruction (a press operation on a target virtual skill shown in FIG. 6) is obtained, whether a fourth virtual character appears within the skill range of the target virtual skill, and whether the second virtual character leaves the skill range.

S3: Control, when the fourth virtual character appears within the skill range of the target virtual skill, and the second virtual character leaves the skill range of the target virtual skill, the skill indicator to move along with the fourth virtual character.

The foregoing description is merely an example, which is not specifically limited in this embodiment.

In some embodiments, the controlling, when a target following function is enabled in the game application, the skill indicator to move along with a target object in the game application includes:

controlling, when the second virtual character is killed, and a fifth virtual character appears within the skill range, the skill indicator to move along with the fifth virtual character in the game application, where the target object includes the fifth virtual character, and the fifth virtual character is a virtual character meeting the preset attack condition within the skill range.

In this embodiment, that the second virtual character is killed may include, a situation that a virtual health point of the second virtual character drops to 0 or another situation determining that the second virtual character cannot continue to play the game.

Figure 7:
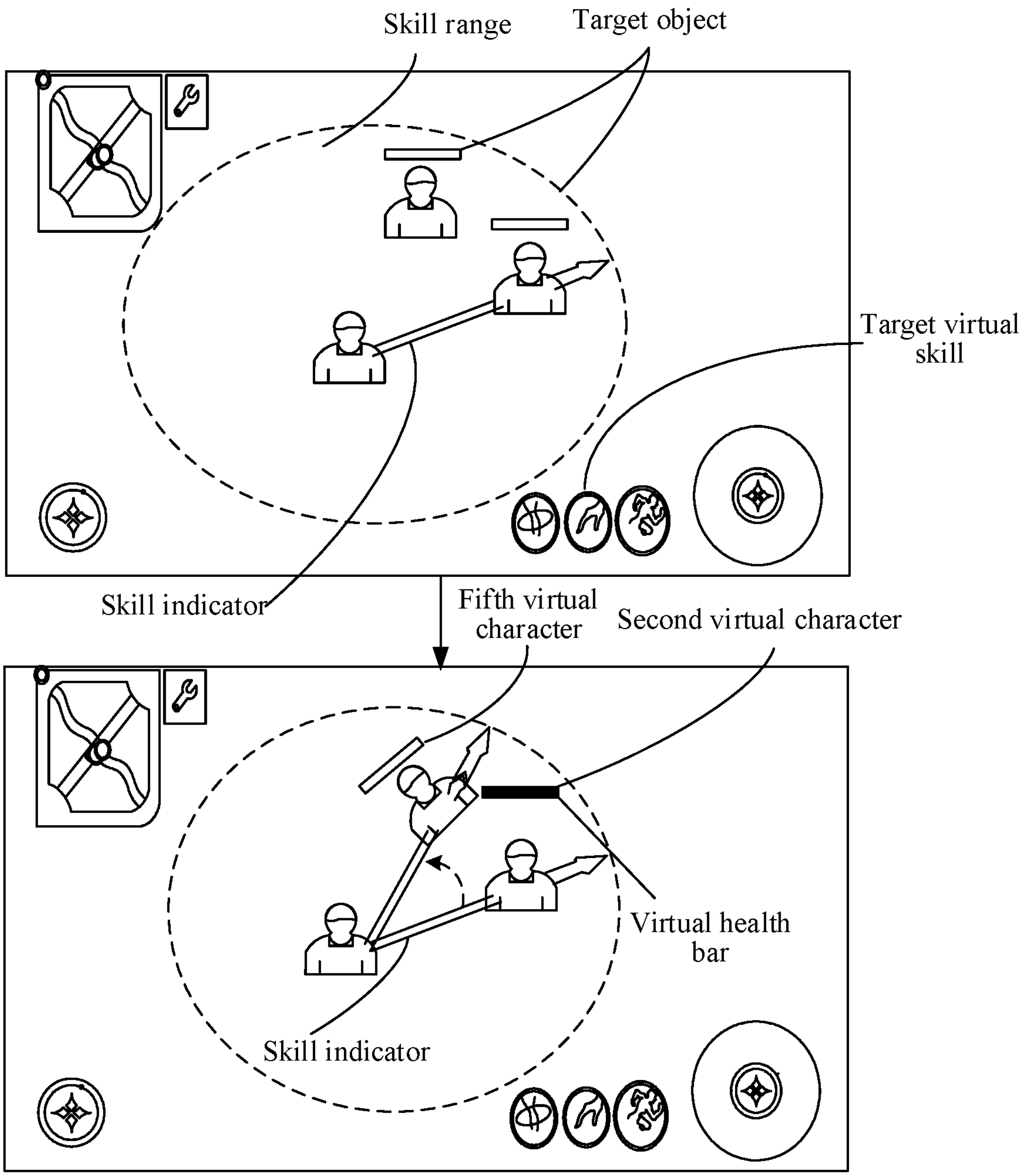
FIG. 7 is a schematic diagram of another method for controlling a skill indicator according to an embodiment of this application.

FIG. 7 is a schematic diagram of another method for controlling a skill indicator according to an embodiment of this application. As shown in FIG. 7, the method includes, but is not limited to, the following steps:

S1: The first following function is enabled on a configuration interface of the game application, and certainly, the first following function may alternatively be configured to be enabled by fault.

S2: Detect, when a target selection instruction (a press operation on a target virtual skill shown in FIG. 7) is obtained, whether a fifth virtual character appears within the skill range of the target virtual skill, and whether a virtual health bar of the second virtual character drops to "0".

S3: Control, when a fifth virtual character appears within the skill range of the target virtual skill, and the virtual health bar of the second virtual character drops to "0", the skill indicator to move along with the fifth virtual character.

The foregoing description is merely an example, which is not specifically limited in this embodiment.

In some embodiments, the method further includes:

searching, when the target virtual skill is a directional skill, an attack range of the target virtual skill for a virtual character meeting a preset first attack condition, where the preset attack condition includes the first attack condition; or searching, when the target virtual skill is a point selecting skill, an enemy searching range of the target virtual skill for a virtual character meeting a preset second attack condition, where the enemy searching range is larger than and includes an attack range, and the preset attack condition includes the second attack condition; or searching, when the target virtual skill is a locking skill, an enemy searching range of the target virtual skill for a virtual character meeting a preset third attack condition, where the preset attack condition includes the third attack condition.

In this embodiment, the directional skill may be a skill cast in a direction, and may select, through the skill indicator, a direction for casting the skill, for example, a virtual shooting skill, a virtual throwing skill, and the like. When a virtual character meeting the first attack condition is found within the attack range of the target virtual skill, the virtual character is determined as the target object.

Figure 8:
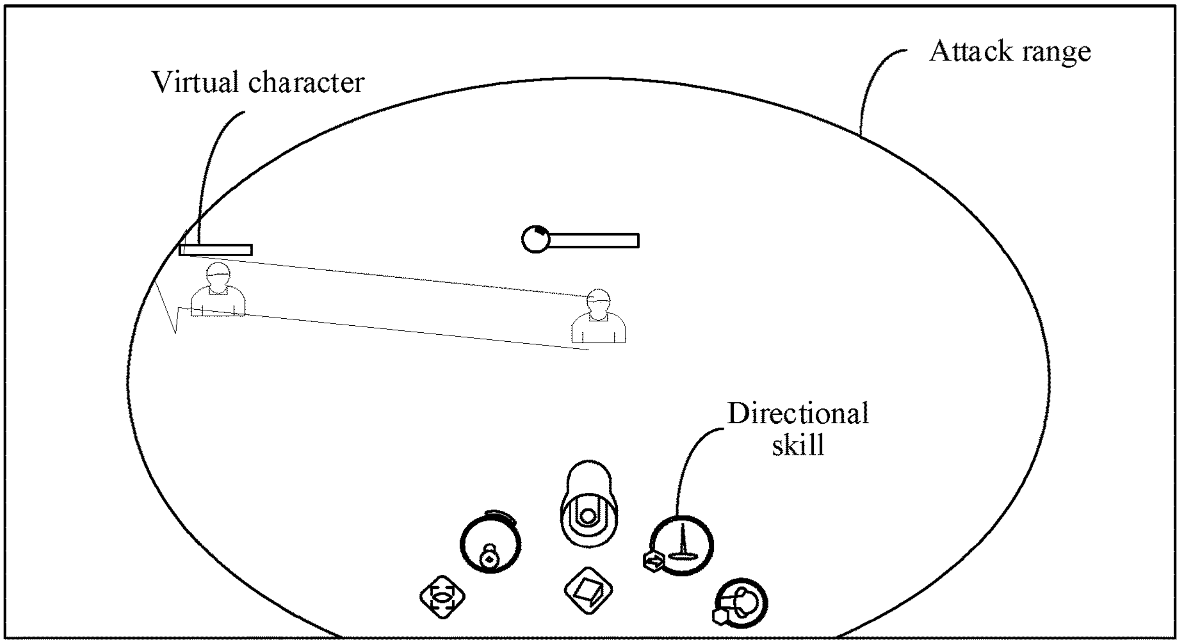
FIG. 8 is a schematic diagram of another method for controlling a skill indicator according to an embodiment of this application.

FIG. 8 is a schematic diagram of another method for controlling a skill indicator according to an embodiment of this application. As shown in FIG. 8, the method includes the following steps:

S1: Obtain a target selection instruction for a "directional skill".

S2: Control, when a virtual character is found within an attack range of the "directional skill", the skill indicator to indicate a direction in which the virtual character is located.

Figure 9:
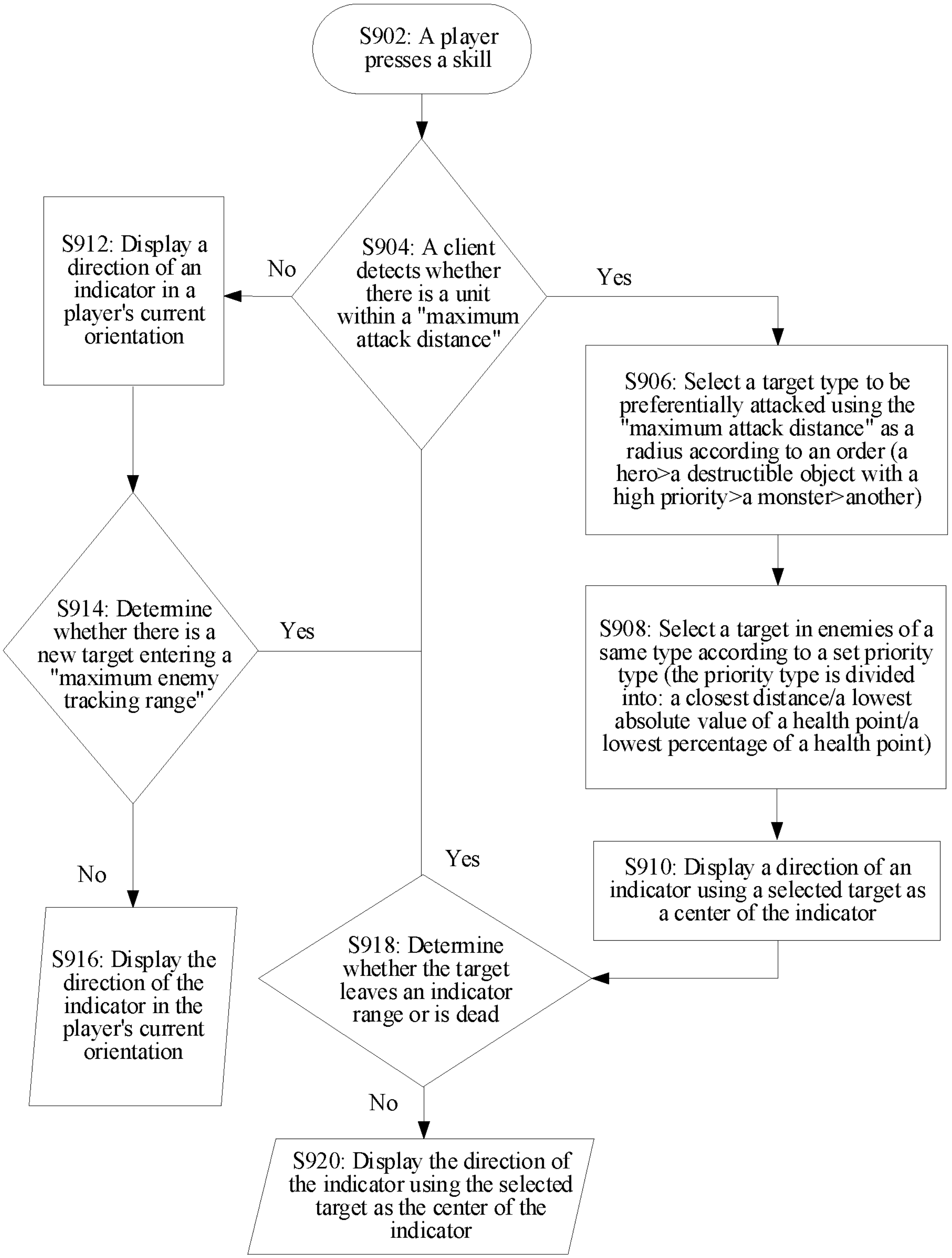
FIG. 9 is a schematic diagram of another method for controlling a skill indicator according to an embodiment of this application.

FIG. 9 is a schematic diagram of another method for controlling a skill indicator according to an embodiment of this application. As shown in FIG. 9, the method for controlling a skill indicator includes, but is not limited to, the following steps:

S902: A player presses a skill (corresponding to the foregoing directional skill).

S904: A client detects whether there is a unit (corresponding to the foregoing virtual object) within a "maximum attack distance" (corresponding to the foregoing attack range).

S906: Select, when a determination result in step S904 is yes, a type of a target to be preferentially attacked using the "maximum attack distance" as a radius according to an order (a hero>a destructible object with a high priority>a monster>another).

S908: Select a target in enemies of a same type according to a set priority type (the priority type is divided into: a closest distance/a lowest absolute value of health points/a lowest percentage of health points).

S910: Display a direction of the skill indicator using a selected target as a center of the skill indicator, and then perform step S918.

S912: When the determination result in step S904 is no, display the direction of the skill indicator in a current orientation of the player, and skip adjust the direction of the skill indicator as the player changes the orientation.

S914: Determine whether there is a new target entering a "maximum enemy tracking range".

S916: Display, when a determination result in step S914 is no, the direction of the skill indicator in a current orientation of the player.

S918: Determine, when the determination result in step S914 is yes, and the determination result in step S904 is yes, whether the target leaves the range of the skill indicator or is dead.

S920: Display, when the determination result in step S918 is no, the direction of the skill indicator using a selected target as a center of the skill indicator.

In this embodiment, the point selecting skill may be a skill cast at a specific position, and may select, through the skill indicator, a position for casting the skill, for example, a virtual throwing skill, a virtual summoning skill, and the like. When a virtual character meeting the second attack condition is found within the attack range of the target virtual skill, the virtual character is determined as the target object.

Figure 10:
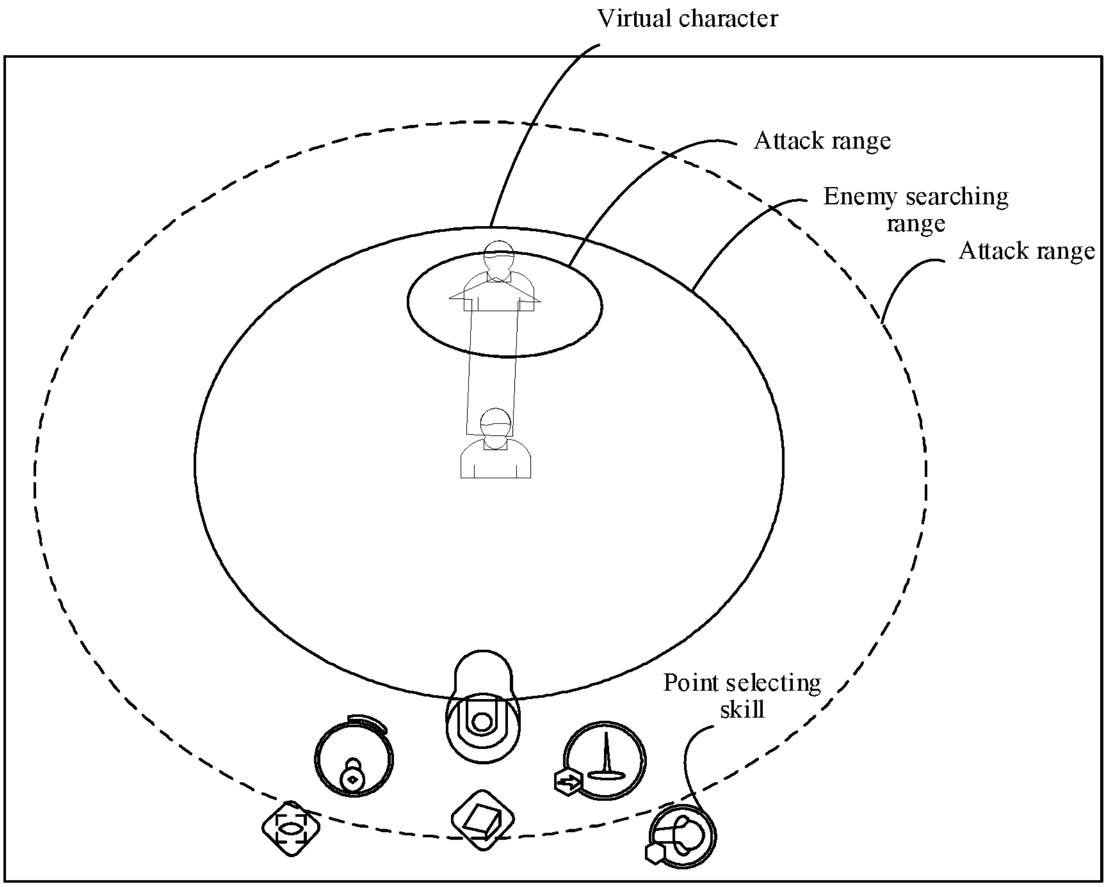
FIG. 10 is a schematic diagram of another method for controlling a skill indicator according to an embodiment of this application.

FIG. 10 is a schematic diagram of another method for controlling a skill indicator according to an embodiment of this application. As shown in FIG. 10, the method includes the following steps:

S1: Obtain a target selection instruction for a "point selecting skill".

S2: Control, when a virtual character is found within an enemy searching range of the "point selecting skill", and the virtual character is within an attack distance of the target virtual skill, the skill indicator to indicate a direction in which the virtual character is located.

Figure 11:
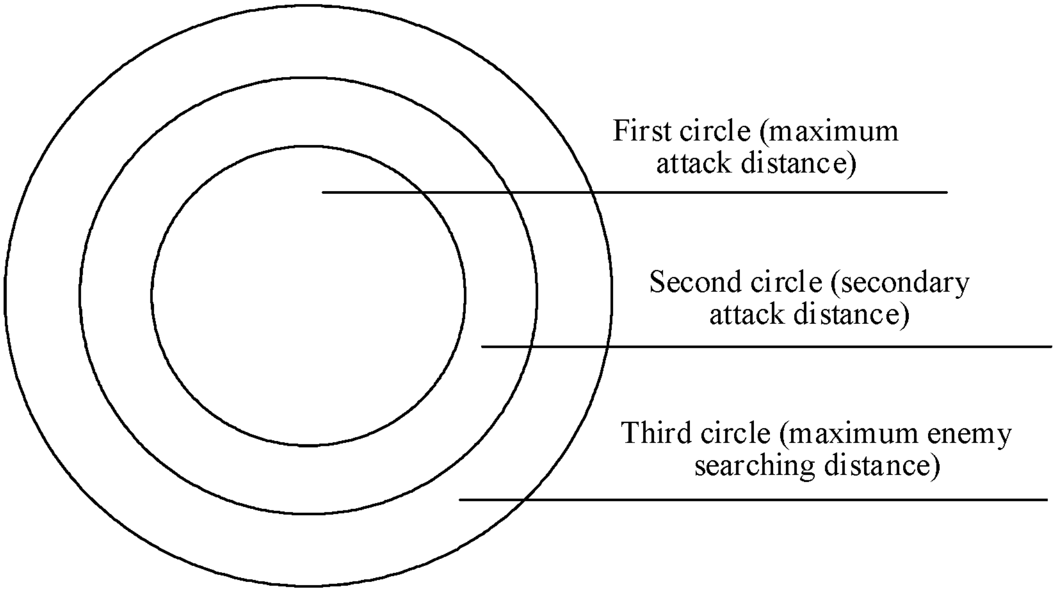
FIG. 11 is a schematic diagram of another method for controlling a skill indicator according to an embodiment of this application.

FIG. 11 is a schematic diagram of another method for controlling a skill indicator according to an embodiment of this application. The attack range and the enemy tracking range may include, but are not limited to those shown in FIG. 11. The enemy tracking range is the enemy searching range shown in FIG. 11.

In this embodiment, the method may include, setting a plurality of attack distances to implement a same or different attack methods of the target virtual skill. To be specific, a first attack method of the target virtual skill is performed when a virtual character is in a "first circle", and a second attack method of the target virtual skill is performed when the virtual character is in a "second circle".

In this embodiment, the locking skill may be a skill cast on a target, and may select, through the skill indicator, a target on which the skill is cast, for example, a virtual control skill, a virtual skill with a roll-call mechanism, and the like. When a virtual character meeting the third attack condition is found within the attack range of the target virtual skill, the virtual character is determined as the target object.

Figure 12:
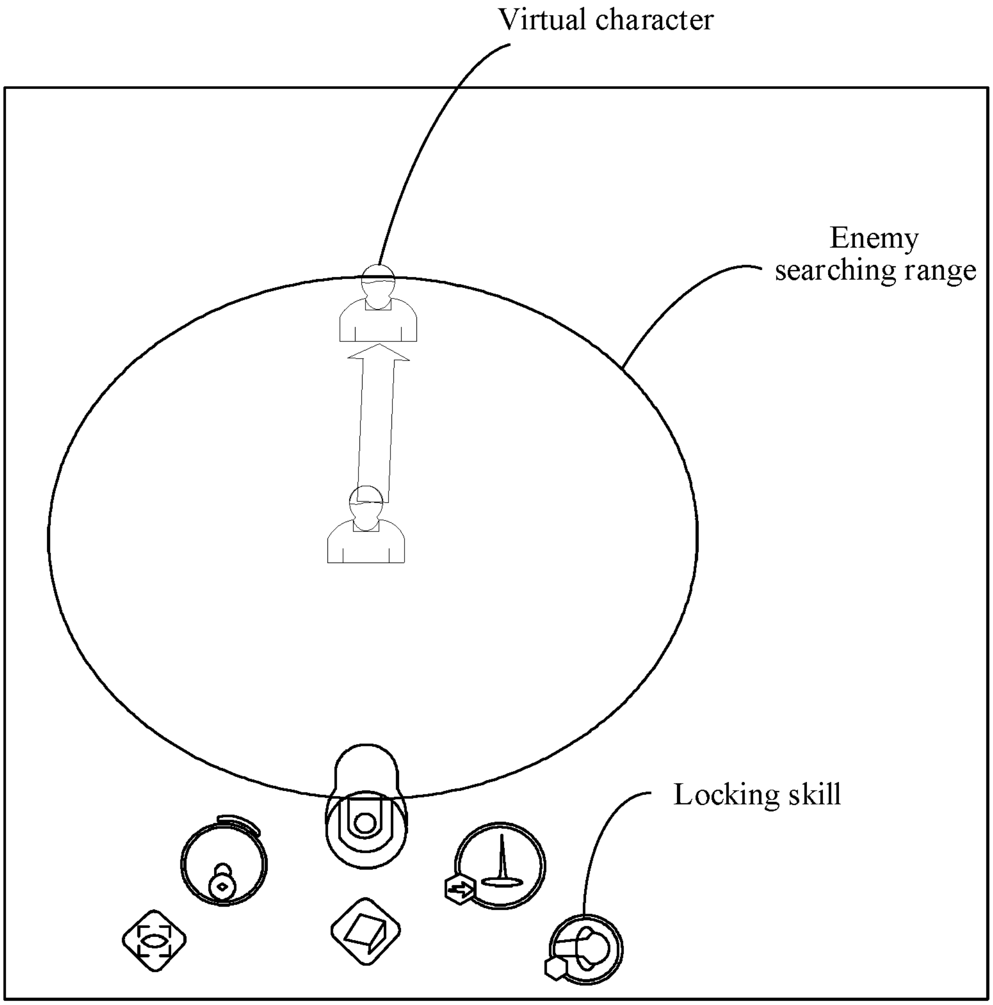
FIG. 12 is a schematic diagram of another method for controlling a skill indicator according to an embodiment of this application.

FIG. 12 is a schematic diagram of another method for controlling a skill indicator according to an embodiment of this application. As shown in FIG. 12, the method includes the following steps:

S1: Obtain a target selection instruction for a "locking skill".

S2: Control, when a virtual character is found within an enemy searching range of the "locking skill", and the virtual character is within an enemy searching range of the target virtual skill, the skill indicator to indicate a direction in which the virtual character is located.

Figure 13:
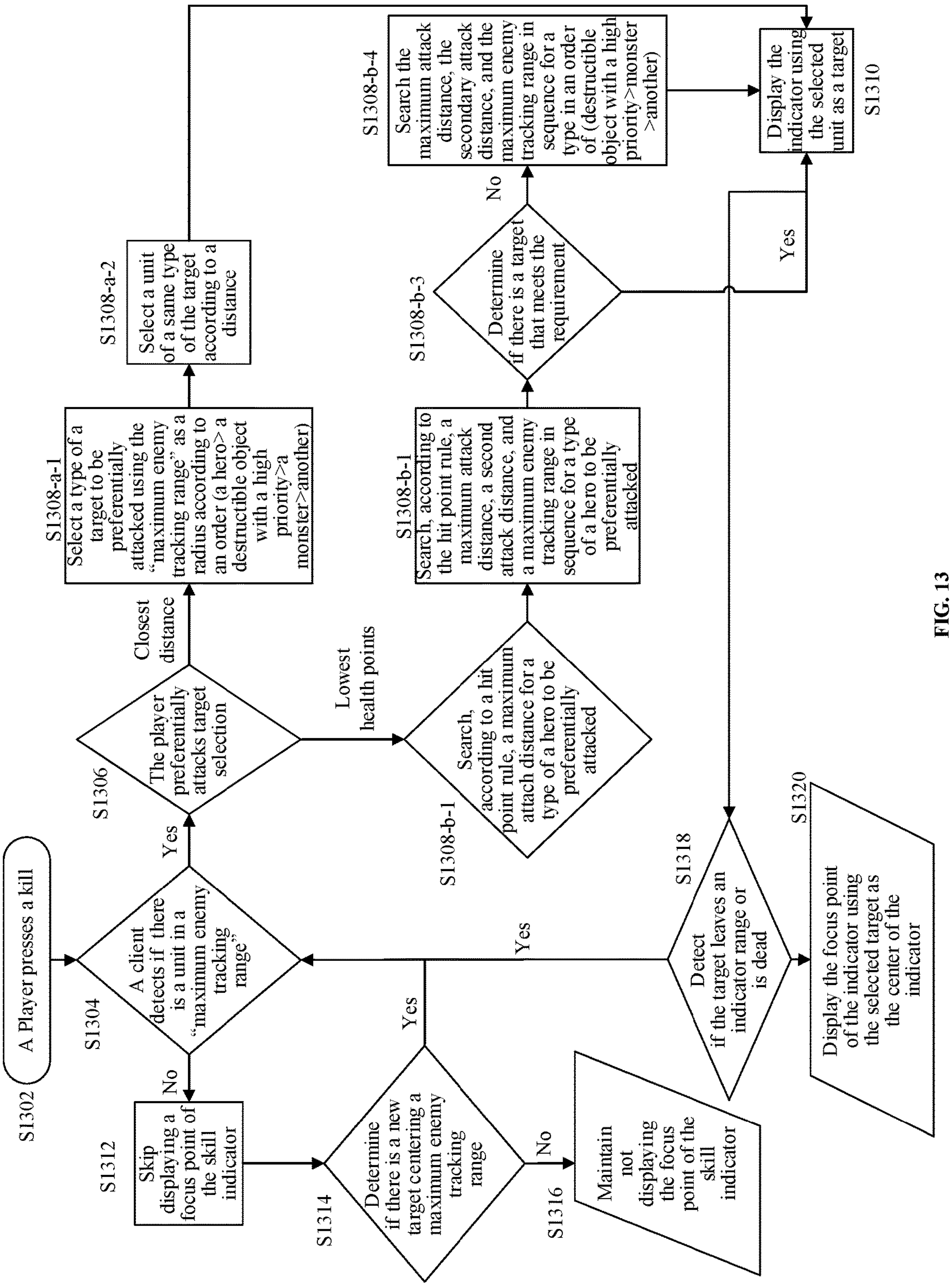
FIG. 13 is a schematic diagram of another method for controlling a skill indicator according to an embodiment of this application.

FIG. 13 is a schematic diagram of another method for controlling a skill indicator according to an embodiment of this application. As shown in FIG. 13, the method for controlling a skill indicator includes, but is not limited to, the following steps:

S1302: A player presses a skill (corresponding to the foregoing locking skill).

S1304: A client detects whether there is a unit (corresponding to the foregoing virtual object) within a "maximum enemy tracking range" (corresponding to the foregoing enemy searching range).

S1306: The player preferentially attacks target selection when a determination result in step S1304 is yes (where the step includes at least but not limited to the following two methods a and b).

S1308-*a*-1: Select a type of a target to be preferentially attacked using the "maximum enemy tracking range" as a radius according to an order (a hero>a destructible object with a high priority>a monster>another).

S1308-*a*-2: Select a unit of a same type of the target according to a distance, and then perform step S1310.

S1308-*b*-1: Search, according to a hit point rule, a "maximum attack distance" for a type of a "hero" to be preferentially attacked.

S1308-*b*-2: Search, according to the hit point rule, a "maximum attack distance", a "secondary attack distance", and a "maximum enemy tracking range" in sequence for a type of a "hero" to be preferentially attacked.

S1308-*b*-3: Determine whether there is a target that meets the requirements, and perform step S1310 when a determination result is yes.

S1308-*b*-4: Search, according to the hit point rule when the determination result in step S1308-*b*-3 is no, the "maximum attack distance", the "secondary attack distance", and the "maximum enemy tracking range" in sequence for a type in an order of (destructible object with a high priority>monster>another).

S1310: Display the skill indicator using the selected unit as a target.

S1312: Skip displaying, when a determination result in step S1304 is no, a focus point of the skill indicator (corresponding to the direction or position of the skill indicator).

S1314: Determine whether there is a new target entering a "maximum enemy tracking range".

S1316: Maintain, when a determination result in step S1314 is no, the focus point of the skill indicator not displayed.

S1318: Re-perform step S1304 when the determination result in step S1314 is yes, and detect, after step S1310 is completed, whether a target leaves the range of the skill indicator or is dead, and re-perform step S1304 when the determination result is yes.

S1320: Display, when the determination result in step S1318 is no, the direction of the skill indicator using a selected target as a focus point of the skill indicator.

The foregoing description is merely an example, which is not specifically limited in this embodiment.

In some embodiments, the controlling, when a target following function is enabled in the game application, the skill indicator to move along with a target object in the game application includes:

controlling, when a second following function is enabled in the game application, the skill indicator to move along with a target joystick in the game application, where the target following function includes the second following function, the target object includes the target joystick, and the target joystick is configured to control movement and rotation of the first virtual character.

In this embodiment, the second following function may include, a function that the skill indicator moves along with the joystick. For example, the skill indicator control, according to the target joystick, movement and rotation of the first virtual character for following.

In this embodiment, the target joystick may include, an input device of a video game console, which performs an operation on buttons and the like to control simulated characters and the like in an application, and adjusts a direction by moving the joystick forward, backward, leftward or rightward. In English, there are two words, namely, Gamepad and Joystick. The difference is that Gamepad is held by a hand, and Joystick is placed flat on a table, for example, a joystick of a gamepad, a portable handheld joystick, and the like. Specifically, Joystick may include a joycon rocker on a joystick gaming platform.

Figure 14:
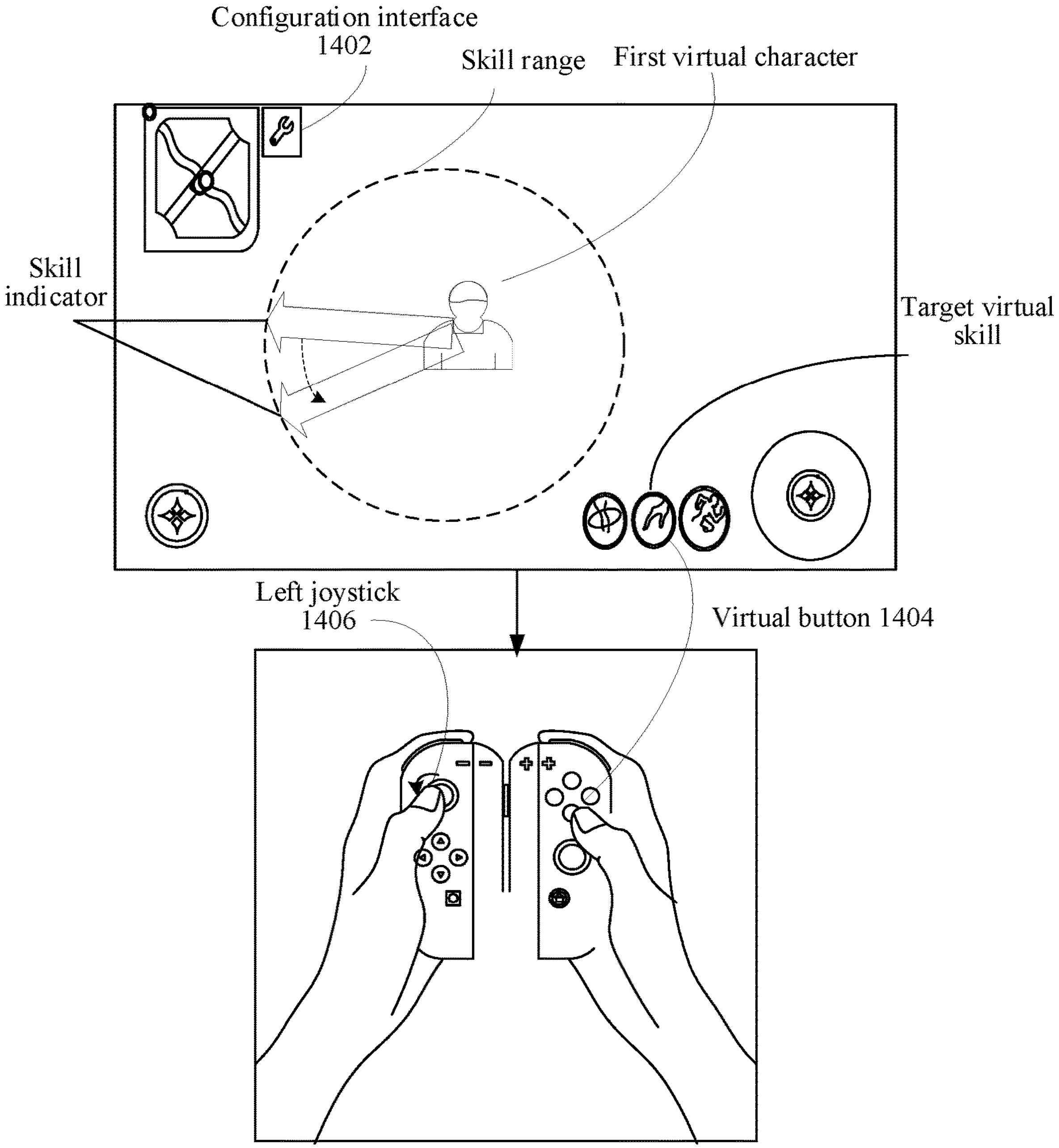
FIG. 14 is a schematic diagram of another method for controlling a skill indicator according to an embodiment of this application.

For example, FIG. 14 is a schematic diagram of another method for controlling a skill indicator according to an embodiment of this application. As shown in FIG. 14, the method for controlling a skill indicator includes but is not limited to the following steps:

S1: The second following function is enabled on a configuration interface 1402 of the game application, and certainly, the second following function may alternatively be configured to be enabled by fault.

S2: Detect, when a target selection instruction (a press operation on a virtual button 1404 shown in FIG. 14) is obtained, whether a left joystick 1406 (corresponding to the foregoing target joystick) moves or rotates.

S3: Control, when movement or rotation of the left joystick is detected, the skill indicator to move along with the target joystick.

The foregoing description is merely an example, which is not specifically limited in this embodiment.

In some embodiments, the controlling the skill indicator to move along with a target joystick in the game application includes:

controlling, when the target virtual skill is a directional skill, a direction of the skill indicator to move along with an input direction of the target joystick in the game application, where the direction of the skill indicator is a direction for casting the target virtual skill, and the input direction of the target joystick is a movement direction or rotation direction of the first virtual character.

In this embodiment, the input direction of the target joystick may include, but is limited to, four directions, eight directions, or the like. The direction of the skill indicator may be correspondingly adjusted according to the input direction of the target joystick.

Figure 15:
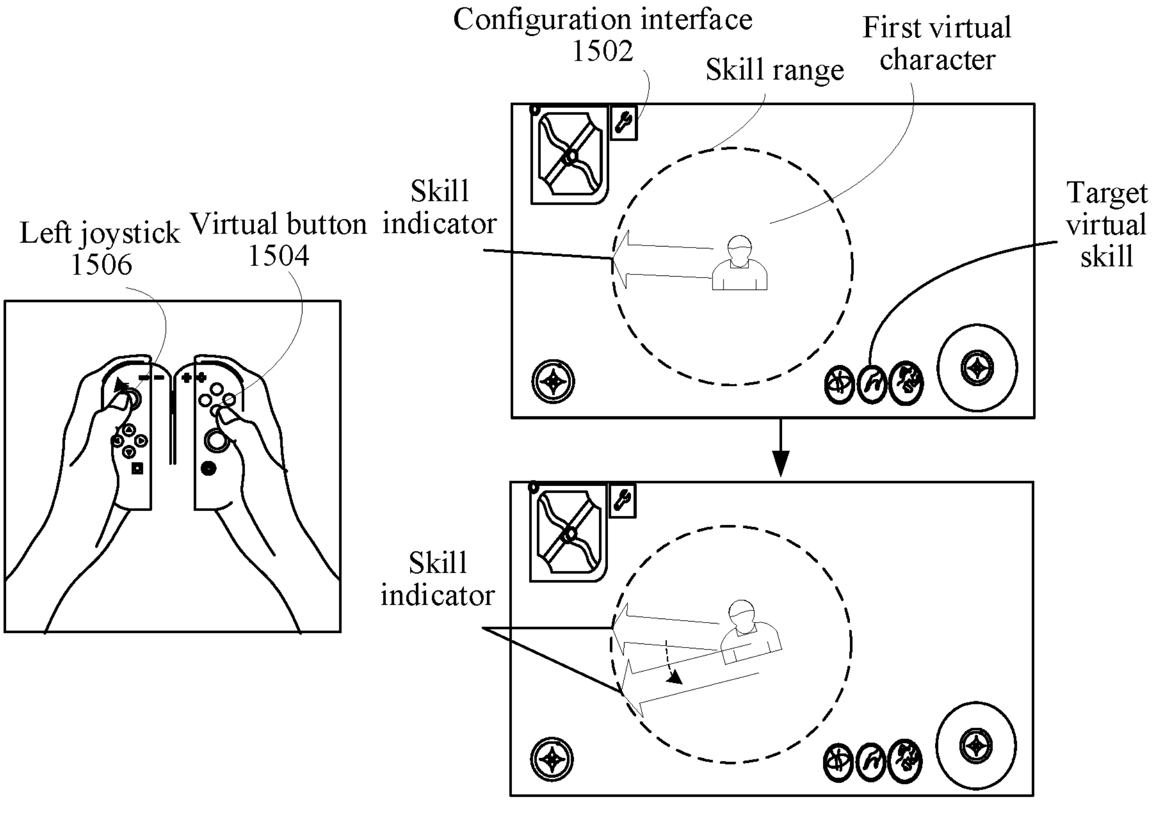
FIG. 15 is a schematic diagram of another method for controlling a skill indicator according to an embodiment of this application.

For example, FIG. 15 is a schematic diagram of another method for controlling a skill indicator according to an embodiment of this application. As shown in FIG. 15, by using an example in which the target joystick is a left joystick that controls movement of the target object, the method for controlling a skill indicator includes but is not limited to the following steps:

S1: The second following function is enabled on a configuration interface 1502 of the game application, and certainly, the second following function may alternatively be configured to be enabled by fault.

S2: Detect, when a target selection instruction (a press operation on a virtual button 1504 shown in FIG. 15) on a directional skill is obtained, whether a left joystick 1506 (corresponding to the foregoing target joystick) moves or rotates.

S3: Control, when movement of the left joystick 1506 in a counterclockwise direction is detected, the skill indicator to move along with the target joystick in the counterclockwise direction.

The foregoing description is merely an example, which is not specifically limited in this embodiment.

In some embodiments, the controlling the skill indicator to move along with a target joystick in the game application includes:

controlling, when the target virtual skill is a point selecting skill, a position of the skill indicator to move along with a target position in an input direction of the target joystick in the game application, where the position of the skill indicator is a position for casting the target virtual skill, the input direction of the target joystick is a movement direction of the first virtual character, and the target position is a farthest position within the skill range of the target virtual skill.

In this embodiment, the input direction of the target joystick may include, but is limited to, four directions, eight directions, or the like. The target position of the skill indicator may be correspondingly adjusted according to the input direction of the target joystick.

Figure 16:
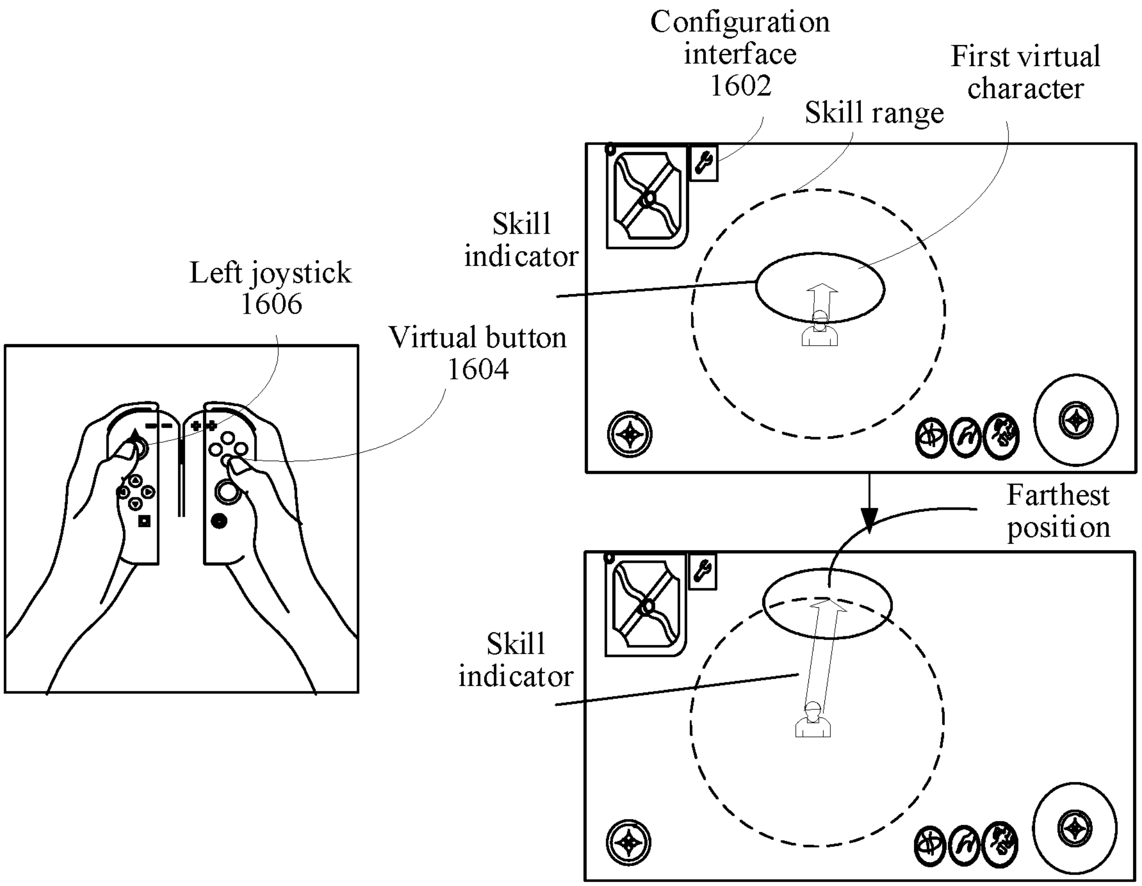
FIG. 16 is a schematic diagram of another method for controlling a skill indicator according to an embodiment of this application.

For example, FIG. 16 is a schematic diagram of another method for controlling a skill indicator according to an embodiment of this application. As shown in FIG. 16, by using an example in which the target joystick is a left joystick that controls movement of the target object, the method for controlling a skill indicator includes but is not limited to the following steps:

S1: The second following function is enabled on a configuration interface 1602 of the game application, and certainly, the second following function may alternatively be configured to be enabled by fault.

S2: Detect, when a target selection instruction (a press operation on a virtual button 1604 shown in FIG. 16) on a point selecting skill is obtained, whether a left joystick 1606 (corresponding to the foregoing target joystick) moves or rotates.

S3: Control, when movement of the left joystick 1606 in an upward direction is detected, the skill indicator to move along with a target position in the upward direction of the target joystick, where the target position is a farthest position within the skill range of the target virtual skill.

The foregoing description is merely an example, which is not specifically limited in this embodiment.

In some embodiments, the method further includes:

obtaining a first skill casting instruction in the game application when the direction of the skill indicator is controlled to move along with the target object to a target direction in the game application, where the skill indicator is configured to indicate a direction for casting the target virtual skill, and the first skill casting instruction is used for instructing to cast the target virtual skill; and casting the target virtual skill toward the target direction in the game application in response to the first skill casting instruction.

In this embodiment, the first skill casting instruction may include, a cast instruction corresponding to the target selection instruction. For example, when the target selection instruction is pressing a virtual button without releasing, the first skill casting instruction may include, releasing the virtual button.

When the target selection instruction is clicking, the first skill casting instruction may also be configured to be implemented by clicking. In other words, the target selection instruction and the first skill casting instruction may be the same or different.

In this embodiment, the target virtual skill is cast in the game application in response to the first skill casting instruction along a direction indicated by the skill indicator.

In some embodiments, the method further includes:

obtaining a second skill casting instruction in the game application when the position of the skill indicator is controlled to move along with the target object to a target position in the game application, where the skill indicator is configured to indicate a position for casting the target virtual skill, and the second skill casting instruction is used for instructing to cast the target virtual skill; and casting the target virtual skill at the target position in response to the second skill casting instruction.

In this embodiment, the second skill casting instruction may include, a cast instruction corresponding to the target selection instruction. For example, when the target selection instruction is pressing a virtual button without releasing, the second skill casting instruction may include, releasing the virtual button.

When the target selection instruction is clicking, the second skill casting instruction may also be configured to be implemented by clicking. In other words, the target selection instruction and the second skill casting instruction may be the same or may be different.

In this embodiment, the target virtual skill is cast in the game application in response to the second skill casting instruction along a position indicated by the skill indicator.

In some embodiments, the controlling, when a target following function is enabled in the game application, the skill indicator to move along with a target object in the game application includes:

controlling, when the first following function is enabled in the game application, and the target virtual skill is a movement skill that causes no damage, the skill indicator to move along with the target joystick in the game application, where the first following function is used for controlling the skill indicator to move along with a virtual character meeting the preset attack condition within the skill range of the target virtual skill; or preferentially controlling, when the first following function and the second following function are enabled in the game application, a priority of the first following function is lower than a priority of the second following function, and the target virtual skill is a point-selecting movement skill that causes damage, the skill indicator to move along with a virtual character meeting the preset attack condition within the skill range in the game application, where the second following function is used for controlling the skill indicator to move along with the target joystick, and the target joystick is configured to control movement and rotation of the first virtual character.

In this embodiment, the target virtual skill is a movement skill that cause no damage, including but not limited to a skill that can be cast to change a position of a character controlled by a player.

When a skill attribute is a movement skill that causes no damage, no matter whether a function of moving along with the joystick is enabled or not, the skill indicator of this type may continue to follow an input direction of the joystick.

Figure 17:
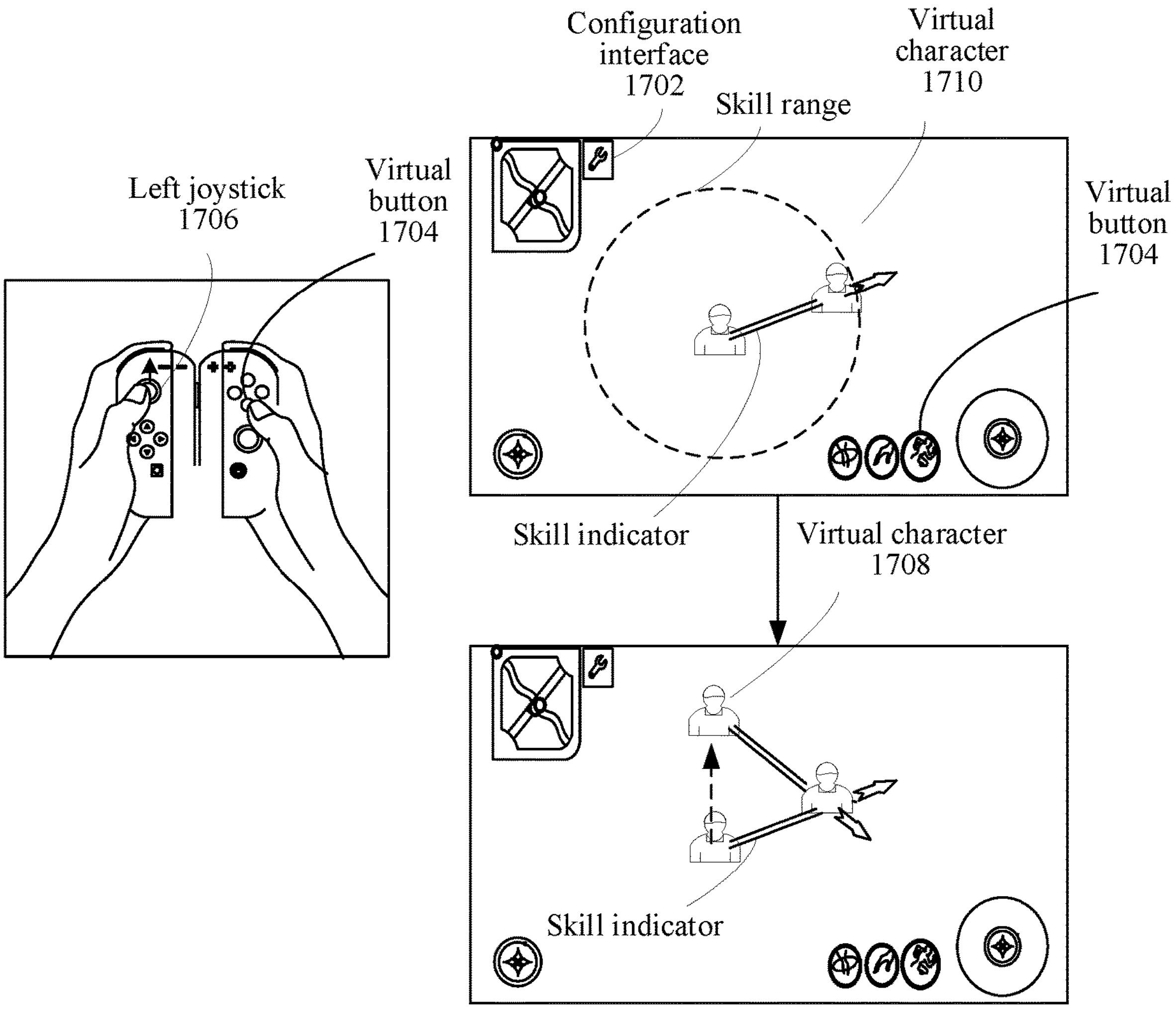
FIG. 17 is a schematic diagram of another method for controlling a skill indicator according to an embodiment of this application.

In this embodiment, FIG. 17 is a schematic diagram of another method for controlling a skill indicator according to an embodiment of this application. As shown in FIG. 17, by using an example in which the target joystick is a left joystick that controls movement of the target object, the method for controlling a skill indicator includes but is not limited to the following steps:

S1: The first following function and the second following function are configured on a configuration interface 1702 of the game application, certainly, the first following function and the second following function may alternatively be configured to be enabled by fault, and a priority relationship between the first following function and the second following function may be allowed to be configured.

S2: Detect, when a target selection instruction (a press operation on a virtual button 1704 shown in FIG. 17) on a point-selecting movement skill that causes damage is obtained, whether a left joystick 1706 (corresponding to the foregoing target joystick) moves or rotates.

S3: Control, when movement of the left joystick 1706 in an upward direction is detected, a virtual character 1708 to move upward, and control the skill indicator to move along with the left joystick in the upward direction, where during movement, an end point of the skill indicator is kept above a virtual character 1710 meeting the preset attack condition.

The foregoing description is merely an example, which is not specifically limited in this embodiment.

In some embodiments, the controlling, when a target following function is enabled in the game application, the skill indicator to move along with a target object in the game application includes:

searching, when the first following function and the second following function are enabled in the game application, and a priority of the first following function is higher than a priority of the second following function, the skill range of the target virtual skill for a virtual character meeting the preset attack condition, where the first following function is used for controlling the skill indicator to move along with a virtual character meeting the preset attack condition within the skill range, the second following function is used for controlling the skill indicator to move along with the target joystick, and the target joystick is configured to control movement and rotation of the first virtual character;

controlling, when no virtual character meeting the preset attack condition is found within the skill range, the skill indicator to move along with the target joystick in the game application; and controlling, when the skill indicator is controlled to move along with the target joystick in the game application, and a second virtual character meeting the preset attack condition is found within the skill range, the skill indicator to switch to moving along with the second virtual character from moving along with the target joystick in the game application.

Figure 18:
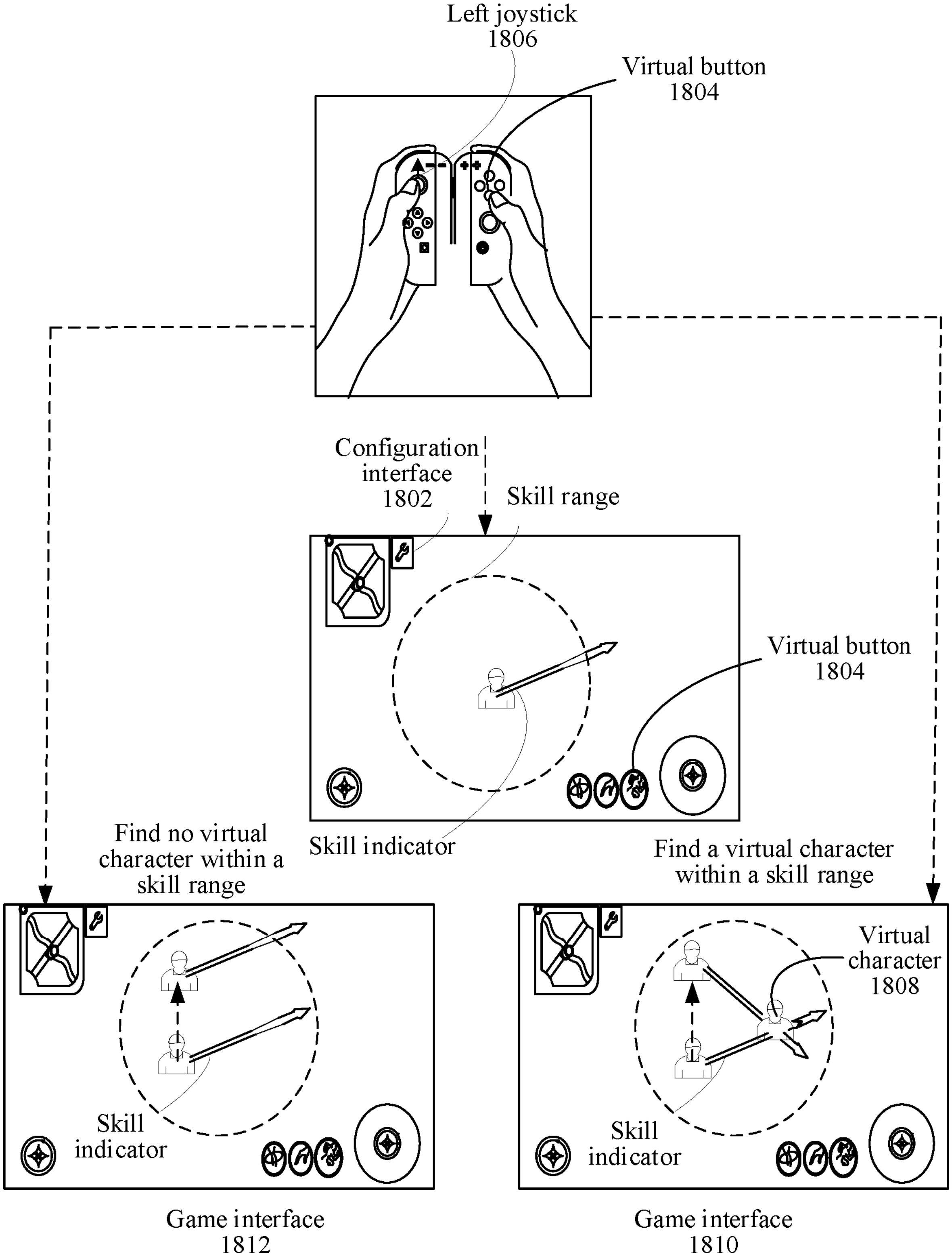
FIG. 18 is a schematic diagram of another method for controlling a skill indicator according to an embodiment of this application.

In this embodiment, FIG. 18 is a schematic diagram of another method for controlling a skill indicator according to an embodiment of this application. As shown in FIG. 18, by using an example in which the target joystick is a left joystick that controls movement of the target object, the method for controlling a skill indicator includes but is not limited to the following steps:

S1: The first following function and the second following function are configured on a configuration interface 1802 of the game application, certainly, the first following function and the second following function may alternatively be configured to be enabled by fault, and a priority relationship between the first following function and the second following function may be allowed to be configured and may be configured as that a priority of the first following function is higher than a priority of the second following function.

S2: Detect, when a target selection instruction executed for the target virtual skill (a press operation on a virtual button 1804 shown in FIG. 18) is obtained, whether a virtual character 1808 meeting the preset attack condition can be found within the skill range of the target virtual skill.

S3: Control, when the virtual character 1808 is detected, the skill indicator to move along with the virtual character 1808 in the game application, as shown on a game interface 1810.

S4: Detect, in the game application when the virtual character 1808 is not detected, whether a left joystick 1806 (corresponding to the target joystick) moves or rotates, as shown on a game interface 1812.

S5: Control, when movement of the left joystick 1806 in an upward direction is detected, a virtual character 1808 to move upward, and control the skill indicator to move along with the left joystick in the upward direction.

The foregoing description is merely an example, which is not specifically limited in this embodiment.

In some embodiments, the controlling, when a target following function is enabled in the game application, the skill indicator to move along with a target object in the game application includes:

controlling, when the first following function and the second following function are enabled in the game application, and a priority of the first following function is lower than a priority of the second following function, the skill indicator to move along with the target joystick in the game application, where the first following function is used for controlling the skill indicator to move along with a virtual character meeting the preset attack condition within the skill range, the second following function is used for controlling the skill indicator to move along with the target joystick, and the target joystick is configured to control movement and rotation of the first virtual character; and controlling, when the second following function is disabled in the game application, the skill indicator to move along with a second virtual character in the game application, where the second virtual character is a virtual character meeting the preset attack condition within the skill range.

Figure 19:
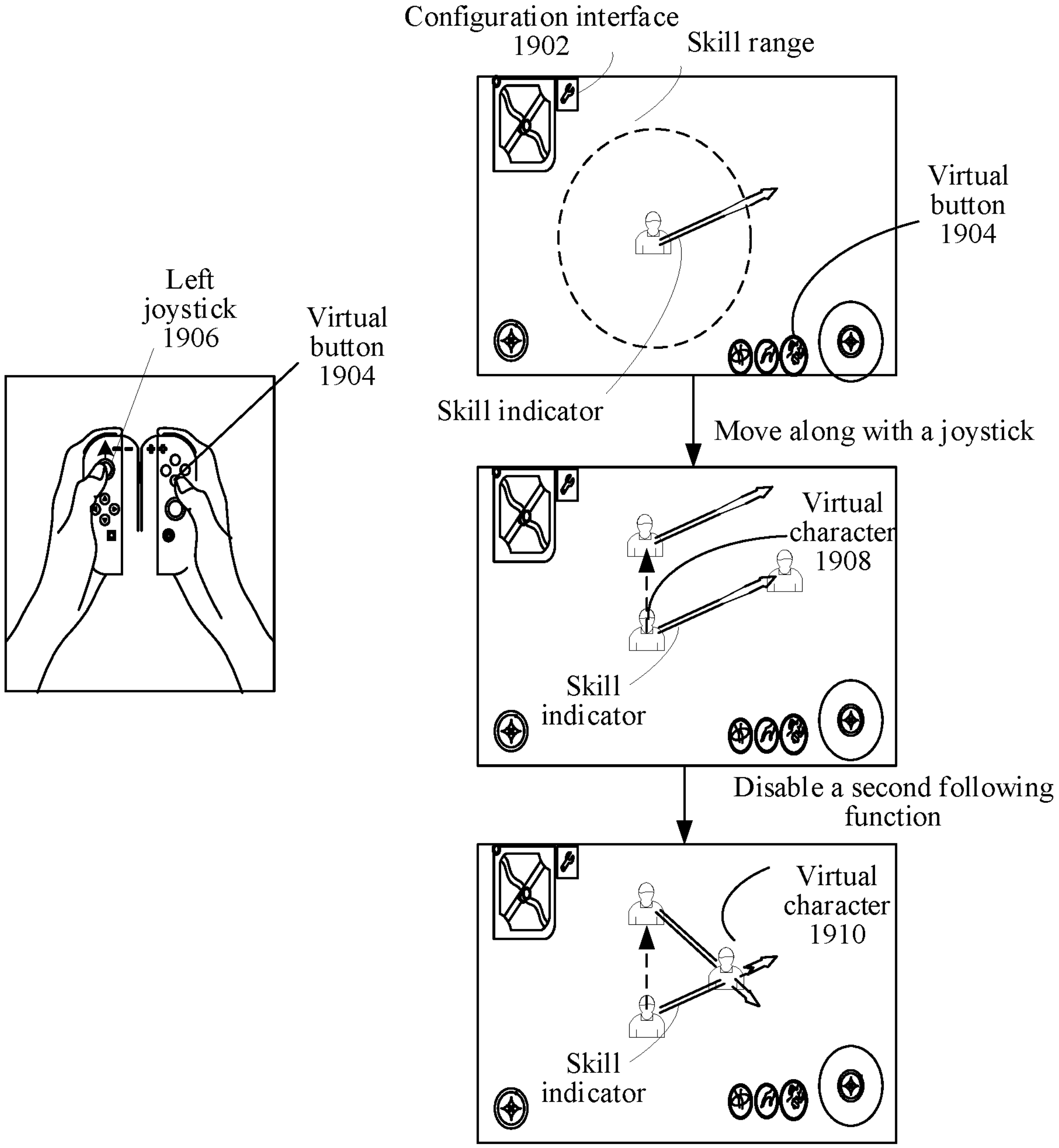
FIG. 19 is a schematic diagram of another method for controlling a skill indicator according to an embodiment of this application.

In this embodiment, FIG. 19 is a schematic diagram of another method for controlling a skill indicator according to an embodiment of this application. As shown in FIG. 19, by using an example in which the target joystick is a left joystick that controls movement of the target object, the method for controlling a skill indicator includes, but is not limited to, the following steps:

S1: The first following function and the second following function are configured on a configuration interface 1902 of the game application, certainly, the first following function and the second following function may alternatively be configured to be enabled by fault, and a priority relationship between the first following function and the second following function may be allowed to be configured and may be configured as that a priority of the first following function is lower than a priority of the second following function.

S2: Detect, in the game application when a target selection instruction (a press operation on a virtual button 1904 shown in FIG. 19) on a target virtual skill is obtained, whether a left joystick 1906 (corresponding to the foregoing target joystick) moves or rotates.

S3: Control, when movement of the left joystick 1906 in an upward direction is detected, a virtual character 1908 to move upward, and control the skill indicator to move along with the left joystick in the upward direction.

S4: Detect, when the second following function is disabled on the game interface 1902 in the game application, a virtual character 1910 meeting the preset attack condition can be found within the skill range of the target virtual skill.

S3: Control, when the virtual character 1910 is detected, the skill indicator to move along with the virtual character 1910 in the game application.

The foregoing description is merely an example, which is not specifically limited in this embodiment.

For ease of description, the foregoing method embodiments are stated as a series of action combinations. However, a person skilled in the art is to learn that this application is not limited to the described sequence of the actions, because according to this application, some steps may be performed in another sequence or may be simultaneously performed. In addition, a person skilled in the art is further to learn that the related actions and modules in the embodiments described in the specification are not necessarily mandatory to this application.

Figure 20:
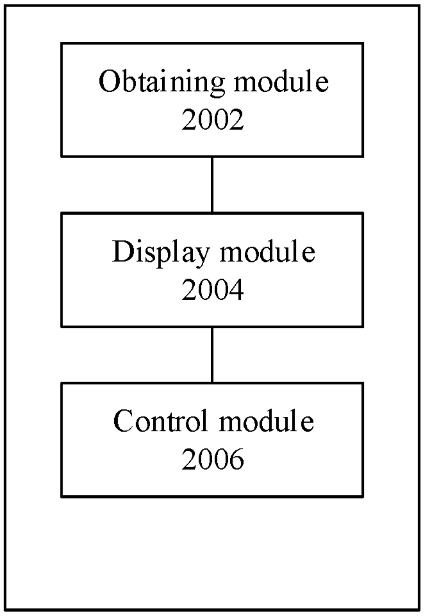
FIG. 20 is a schematic structural diagram of an apparatus for controlling a skill indicator according to an embodiment of this application.

According to another aspect of the embodiments of this application, an apparatus for controlling a skill indicator that is configured to implement the method for controlling a skill indicator is further provided. As shown in FIG. 20, the apparatus includes: an obtaining module 2002, configured to obtain a target selection instruction in a game application, the target selection instruction being used for selecting a target virtual skill of a first virtual character as a virtual skill to be cast;

a display module 2004, configured to display a skill indicator of the target virtual skill in the game application in response to the target selection instruction; and a control module 2006, configured to control, when a target following function is enabled in the game application, the skill indicator to move along with a target object in the game application, the target following function being used for controlling the skill indicator to move along with the target object.

In an embodiment of FIG. 20, the skill indicator is configured to indicate a direction or position for casting the target virtual skill.

In some embodiments, the apparatus is configured to control, when a target following function is enabled in the game application, the skill indicator to move along with a target object in the game application in the following manner: controlling, when a first following function is enabled in the game application, the skill indicator to move along with a second virtual character in the game application, where the target following function includes the first following function, the target object includes the second virtual character, and the second virtual character is a virtual character meeting a preset attack condition within a skill range of the target virtual skill.

In some embodiments, the apparatus is configured to control, when a target following function is enabled in the game application, the skill indicator to move along with a target object in the game application in the following manner: controlling, when the first following function is enabled in the game application, and the virtual character meeting the preset attack condition within the skill range is changed from the second virtual character to a third virtual character, the skill indicator to move along with the third virtual character in the game application, where the target object includes the third virtual character.

In some embodiments, the apparatus is configured to control, when a target following function is enabled in the game application, the skill indicator to move along with a target object in the game application in the following manner: controlling, when the first following function is enabled in the game application, and the second virtual character leaves the skill range and a fourth virtual character appears within the skill range, the skill indicator to move along with the fourth virtual character in the game application, where the target object includes the fourth virtual character, and the fourth virtual character is a virtual character meeting the preset attack condition within the skill range.

In some embodiments, the apparatus is configured to control, when a target following function is enabled in the game application, the skill indicator to move along with a target object in the game application in the following manner: controlling, when the second virtual character is killed, and a fifth virtual character appears within the skill range, the skill indicator to move along with the fifth virtual character in the game application, where the target object includes the fifth virtual character, and the fifth virtual character is a virtual character meeting the preset attack condition within the skill range.

In some embodiments, the apparatus is further configured to: search, when the target virtual skill is a directional skill, an attack range of the target virtual skill for a virtual character meeting a preset first attack condition, where the preset attack condition includes the first attack condition; or search, when the target virtual skill is a point selecting skill, an enemy searching range of the target virtual skill for a virtual character meeting a preset second attack condition, where the enemy searching range is larger than and includes an attack range, and the preset attack condition includes the second attack condition; or search, when the target virtual skill is a locking skill, an enemy searching range of the target virtual skill for a virtual character meeting a preset third attack condition, where the preset attack condition includes the third attack condition.

In some embodiments, the apparatus is configured to control, when a target following function is enabled in the game application, the skill indicator to move along with a target object in the game application in the following manner: controlling, when a second following function is enabled in the game application, the skill indicator to move along with a target joystick in the game application, where the target following function includes the second following function, the target object includes the target joystick, and the target joystick is configured to control movement and rotation of the first virtual character.

In some embodiments, the apparatus is configured to control the skill indicator to move along with a target joystick in the game application in the following manner: controlling, when the target virtual skill is a directional skill, a direction of the skill indicator to move along with an input direction of the target joystick in the game application, where the direction of the skill indicator is a direction for casting the target virtual skill, and the input direction of the target joystick is a movement direction or rotation direction of the first virtual character.

In some embodiments, the apparatus is configured to control the skill indicator to move along with a target joystick in the game application in the following manner: controlling, when the target virtual skill is a point selecting skill, a position of the skill indicator to move along with a target position in an input direction of the target joystick in the game application, where the position of the skill indicator is a position for casting the target virtual skill, the input direction of the target joystick is a movement direction of the first virtual character, and the target position is a farthest position within the skill range of the target virtual skill.

In some embodiments, the apparatus is further configured to: obtain a first skill casting instruction in the game application when the direction of the skill indicator is controlled to move along with the target object to a target direction in the game application, where the skill indicator is configured to indicate a direction for casting the target virtual skill, and the first skill casting instruction is used for instructing to cast the target virtual skill; and cast the target virtual skill toward the target direction in the game application in response to the first skill casting instruction.

In some embodiments, the apparatus is further configured to: obtain a second skill casting instruction in the game application when the position of the skill indicator is controlled to move along with the target object to a target position in the game application, where the skill indicator is configured to indicate a position for casting the target virtual skill, and the second skill casting instruction is used for instructing to cast the target virtual skill; and cast the target virtual skill at the target position in response to the second skill casting instruction.

In some embodiments, the apparatus is configured to control, when a target following function is enabled in the game application, the skill indicator to move along with a target object in the game application in the following manner: controlling, when the first following function is enabled in the game application, and the target virtual skill is a movement skill that causes no damage, the skill indicator to move along with the target joystick in the game application, where the first following function is used for controlling the skill indicator to move along with a virtual character meeting the preset attack condition within the skill range of the target virtual skill; or preferentially controlling, when the first following function and the second following function are enabled in the game application, a priority of the first following function is lower than a priority of the second following function, and the target virtual skill is a point-selecting movement skill that causes damage, the skill indicator to move along with a virtual character meeting the preset attack condition within the skill range in the game application, where the second following function is used for controlling the skill indicator to move along with the target joystick, and the target joystick is configured to control movement and rotation of the first virtual character.

In some embodiments, the apparatus is configured to control, when a target following function is enabled in the game application, the skill indicator to move along with a target object in the game application in the following manner: searching, when the first following function and the second following function are enabled in the game application, and a priority of the first following function is higher than a priority of the second following function, the skill range of the target virtual skill for a virtual character meeting the preset attack condition, where the first following function is used for controlling the skill indicator to move along with a virtual character meeting the preset attack condition within the skill range, the second following function is used for controlling the skill indicator to move along with the target joystick, and the target joystick is configured to control movement and rotation of the first virtual character; controlling, when no virtual character meeting the preset attack condition is found within the skill range, the skill indicator to move along with the target joystick in the game application; and controlling, when the skill indicator is controlled to move along with the target joystick in the game application, and a second virtual character meeting the preset attack condition is found within the skill range, the skill indicator to switch to moving along with the second virtual character from moving along with the target joystick in the game application.

In some embodiments, the apparatus is configured to control, when a target following function is enabled in the game application, the skill indicator to move along with a target object in the game application in the following manner: controlling, when the first following function and the second following function are enabled in the game application, and a priority of the first following function is lower than a priority of the second following function, the skill indicator to move along with the target joystick in the game application, where the first following function is used for controlling the skill indicator to move along with a virtual character meeting the preset attack condition within the skill range, the second following function is used for controlling the skill indicator to move along with the target joystick, and the target joystick is configured to control movement and rotation of the first virtual character; and controlling, when the second following function is disabled in the game application, the skill indicator to move along with a second virtual character in the game application, where the second virtual character is a virtual character meeting the preset attack condition within the skill range.

Figure 21:
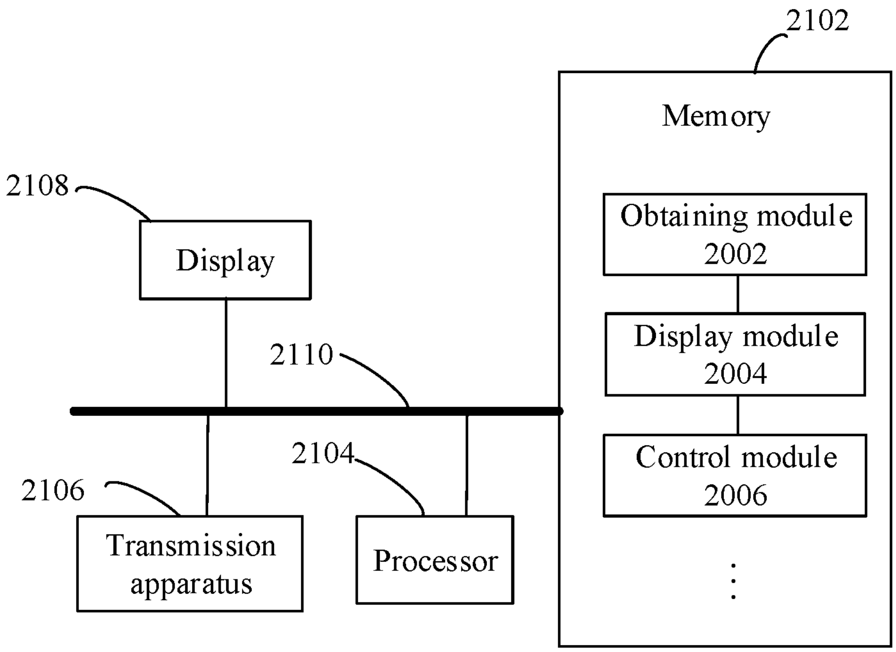
FIG. 21 is a schematic structural diagram of an electronic device according to an embodiment of this application.

According to another aspect of the embodiments of this application, an electronic device configured to implement the method for controlling a skill indicator is further provided. The electronic device may be the terminal device or the server shown in FIG. 1. In this embodiment, description is made by using an example in which the electronic device is a terminal. As shown in FIG. 21, the electronic device includes a memory 2102 and a processor 2104. The memory 2102 stores a computer program. The processor 2104 is configured to perform the steps in any one of the foregoing method embodiments by running the computer program.

In this embodiment, the electronic device may be located in at least one of a plurality of network devices in a computer network.

In this embodiment, the processor may be configured to perform the following steps by running the computer program:

- S1: Obtain a target selection instruction in a game application, the target selection instruction being used for selecting a target virtual skill of a first virtual character as a virtual skill to be cast.
- S2: Display a skill indicator of the target virtual skill in the game application in response to the target selection instruction.
- S3: Control, when a target following function is enabled in the game application, the skill indicator to move along with a target object in the game application, the target following function being used for controlling the skill indicator to move along with the target object.

A person of ordinary skill in the art may understand that, the structure shown in FIG. 21 is only illustrative. The electronic device may be a terminal device such as a smartphone (such as an Android mobile phone or an iOS mobile phone), a tablet computer, a palmtop computer, a MID, or a PAD. FIG. 21 does not limit the structure of the electronic device. For example, the electronic device may further include more or fewer components (such as a network interface) than those shown in FIG. 21, or have a configuration different from that shown in FIG. 21.

The memory 2102 may be configured to store a software program and a module, for example, a program instruction/module corresponding to the method and apparatus for controlling a skill indicator in the embodiments of this application, and the processor 2104 performs various functional applications and data processing by running the software program and the module stored in the memory 2102, that is, implementing the foregoing method for controlling a skill indicator. The memory 2102 may include a high-speed random access memory, and may also include a non-volatile memory, for example, one or more magnetic storage apparatuses, a flash memory, or another non-volatile solid-state memory. In some embodiments, the memory 2102 may further include memories remotely disposed relative to the processor 2104, and the remote memories may be connected to a terminal through a network. Examples of the network include, but are not limited to, the Internet, an intranet, a local area network, a mobile communication network, and a combination thereof. The memory 2102 may specifically store information such as a skill indicator or a target object. In an example, as shown in FIG. 21, the memory 2102 may include the obtaining module 2002, the display module 2004, and the control module 2006 in the apparatus for controlling a skill indicator. In addition, the memory may also include other modules and units in the apparatus for controlling a skill indicator, which will not be repeated in this example.

The transmission apparatus 2106 is configured to receive or transmit data through a network. Specific examples of the foregoing network may include a wired network and a wireless network. In an example, the transmission apparatus 2106 includes a network interface controller (NIC). The NIC may be connected to another network device and a router by using a network cable, to communicate with the Internet or a local area network. In an example, the transmission apparatus 2106 is a radio frequency (RF) module, which communicates with the Internet in a wireless manner.

In addition, the electronic device further includes: a display 2108, configured to display a game picture of the game application; and a connection bus 2110, configured to connect various module components in the electronic device.

In other embodiments, the terminal device or server may be a node in a distributed system. The distributed system may be a blockchain system. The blockchain system may be a distributed system formed by the plurality of nodes connected in the form of network communication. A peer to peer (P2P) network may be formed among the nodes, and a computing device in any form such as a server, a terminal or another electronic device may become a node in the blockchain system by joining the P2P network.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the method provided in the embodiments for controlling a skill indicator in the foregoing aspects. The computer program being configured to perform, when being run, steps in any one of the foregoing method embodiments.

In this embodiment, the computer-readable storage medium may be configured to store a computer program configured to perform the following steps:

S1: Obtain a target selection instruction in a game application, the target selection instruction being used for selecting a target virtual skill of a first virtual character as a virtual skill to be cast.

S2: Display a skill indicator of the target virtual skill in the game application in response to the target selection instruction.

S3: Control, when a target following function is enabled in the game application, the skill indicator to move along with a target object in the game application, the target following function being used for controlling the skill indicator to move along with the target object.

In this embodiment, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disk, and the like.

The sequence numbers of the foregoing embodiments of this application are merely for description purposes, and are not intended to indicate the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, descriptions of the embodiments have respective focuses. As for parts that are not described in detail in one embodiment, reference may be made to the relevant descriptions of the other embodiments.

In the several embodiments provided in this application, it is to be understood that, the disclosed client may be implemented in another manner. The apparatus embodiments described above are merely exemplary. For example, the unit division is merely logical function division and may be other division in some embodiments. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to specific requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary embodiments of this application. A person of ordinary skill in the art may further make several improvements and modifications without departing from the principle of this application, and the improvements and modifications are also considered as falling within the protection scope of this application.

What is claimed is:

1. A method for controlling a skill indicator, performed by an electronic device, the method comprising:

obtaining a target selection instruction in a game application, the target selection instruction selecting a target virtual skill of a first virtual character;

displaying a skill indicator of the target virtual skill in the game application in response to the target selection instruction, wherein the skill indicator indicate a direction or position for casting the target virtual skill; and controlling the skill indicator to move along with a target object in the game application when a target following function is enabled in the game application, comprising:

enabling a first following function and a second following function in the game application, the first following function controlling the skill indicator to move along with a virtual character meeting an attack condition within a skill range, and the second following function controlling the skill indicator to move along with a target joystick configured to control movement and rotation of the first virtual character;

comparing a priority of the first following function with a priority of the second following function;

in response to the priority of the first following function being lower than the priority of the second following function, controlling the skill indicator to move along with the target joystick in the game application; and in response to the second following function being disabled in the game application, controlling the skill indicator to move along with a second virtual character in the game application, wherein the second virtual character meets the attack condition within the skill range.

2. The method according to claim 1, wherein the controlling, when a target following function is enabled in the game application, the skill indicator to move along with a target object in the game application comprises:

controlling, when the virtual character meeting the attack condition within the skill range is changed from the second virtual character to a third virtual character, the skill indicator to move along with the third virtual character in the game application.

3. The method according to claim 1, wherein the controlling, when a target following function is enabled in the game application, the skill indicator to move along with a target object in the game application comprises:

controlling, when the second virtual character leaves the skill range and a fourth virtual character appears within the skill range, the skill indicator to move along with the fourth virtual character in the game application, wherein the fourth virtual character meets the attack condition within the skill range.

4. The method according to claim 1, wherein the controlling, when a target following function is enabled in the game application, the skill indicator to move along with a target object in the game application comprises:

controlling, when the second virtual character is killed and a fifth virtual character appears within the skill range, the skill indicator to move along with the fifth virtual character in the game application, wherein the fifth virtual character meets the attack condition within the skill range.

5. The method according to claim 1, further comprising:

searching an attack range of the target virtual skill for a virtual character meeting a first attack condition when the target virtual skill is a directional skill.

6. The method according to claim 1, further comprising:

searching an enemy searching range of the target virtual skill for a virtual character meeting a second attack condition when the target virtual skill is a point selecting skill, wherein the enemy searching range is larger than or equal to an attack range.

7. The method according to claim 1, further comprising:

searching an enemy searching range of the target virtual skill for a virtual character meeting a third attack condition when the target virtual skill is a locking skill.

8. The method according to claim 1, wherein the controlling the skill indicator to move along with the target joystick in the game application comprises:

controlling a direction of the skill indicator to move along with an input direction of the target joystick in the game application when the target virtual skill is a directional skill, wherein the direction of the skill indicator is a direction for casting the target virtual skill, and the input direction of the target joystick is a movement direction or rotation direction of the first virtual character.

9. The method according to claim 1, wherein the controlling the skill indicator to move along with the target joystick in the game application comprises:

controlling a position of the skill indicator to move along with a target position in an input direction of the target joystick in the game application when the target virtual skill is a point selecting skill, wherein the position of the skill indicator is a position for casting the target virtual skill, the input direction of the target joystick is a movement direction of the first virtual character, and the target position is a farthest position within the skill range of the target virtual skill.

10. The method according to claim 1, further comprising:

obtaining a first skill casting instruction in the game application when the direction of the skill indicator is controlled to move along with the target object to a target direction in the game application, wherein the skill indicator indicates a direction for casting the target virtual skill; and casting the target virtual skill toward the target direction in the game application in response to the first skill casting instruction.

11. The method according to claim 1, further comprising:

obtaining a second skill casting instruction in the game application when the position of the skill indicator is controlled to move along with the target object to a target position in the game application, wherein the skill indicator indicates a position for casting the target virtual skill; and casting the target virtual skill at the target position in response to the second skill casting instruction.

12. The method according to claim 1, wherein the controlling, when a target following function is enabled in the game application, the skill indicator to move along with a target object in the game application comprises:

controlling the skill indicator to move along with the target joystick in the game application when the first following function is enabled in the game application.

13. The method according to claim 1, wherein the controlling, when a target following function is enabled in the game application, the skill indicator to move along with a target object in the game application comprises:

preferentially controlling the skill indicator to move along with a virtual character meeting the attack condition within the skill range in the game application in response to that the priority of the first following function is lower than the priority of the second following function, and in response to that the target virtual skill is a point-selecting movement skill that causes damage.

14. The method according to claim 1, wherein the controlling, the skill indicator to move along with the target object in the game application further comprises: in response to the priority of the first following function being higher than the priority of the second following function, searching in the skill range of the target virtual skill for a virtual character meeting the attack condition in response to finding the second virtual character meeting the attack condition in the skill range, controlling the skill indicator move along with the second virtual character;

in response to finding no virtual character meeting the attack condition within the skill range, controlling the skill indicator to switch from moving along with the second virtual character to moving along with the target joystick in the game application.

15. The method according to claim 1, further comprising:

in response to a skill casting instruction, controlling the first virtual object to cast the target virtual skill based on the skill indicator.

16. A non-transitory computer-readable storage medium, comprising a program stored therein, the program, when being executed on a terminal device or a computer, causing the terminal device or the computer to perform:

obtaining a target selection instruction in a game application, the target selection instruction selecting a target virtual skill of a first virtual character;

displaying a skill indicator of the target virtual skill in the game application in response to the target selection instruction, wherein the skill indicator indicate a direction or position for casting the target virtual skill; and controlling the skill indicator to move along with a target object in the game application when a target following function is enabled in the game application, comprising:

enabling a first following function and a second following function in the game application, the first following function controlling the skill indicator to move along with a virtual character meeting an attack condition within a skill range, and the second following function controlling the skill indicator to move along with a target joystick configured to control movement and rotation of the first virtual character;

comparing a priority of the first following function with a priority of the second following function;

in response to the priority of the first following function being lower than the priority of the second following function, controlling the skill indicator to move along with the target joystick in the game application; and in response to the second following function being disabled in the game application, controlling the skill indicator to move along with a second virtual character in the game application, wherein the second virtual character meets the attack condition within the skill range.

17. An electronic device, comprising a memory and a processor, the memory storing a computer program, and the processor being configured to perform:

obtaining a target selection instruction in a game application, the target selection instruction selecting a target virtual skill of a first virtual character;

displaying a skill indicator of the target virtual skill in the game application in response to the target selection instruction, wherein the skill indicator indicate a direction or position for casting the target virtual skill; and controlling the skill indicator to move along with a target object in the game application when a target following function is enabled in the game application, comprising:

enabling a first following function and a second following function in the game application, the first following function controlling the skill indicator to move along with a virtual character meeting an attack condition within a skill range, and the second following function controlling the skill indicator to move along with a target joystick configured to control movement and rotation of the first virtual character;

comparing a priority of the first following function with a priority of the second following function;

in response to the priority of the first following function being lower than the priority of the second following function, controlling the skill indicator to move along with the target joystick in the game application; and in response to the second following function being disabled in the game application, controlling the skill indicator to move along with a second virtual character in the game application, wherein the second virtual character meets the attack condition within the skill range.

* * * * *